(12) United States Patent
Archie

(10) Patent No.: US 11,925,941 B2
(45) Date of Patent: Mar. 12, 2024

(54) DEBUCKING MACHINE AND METHOD OF USE

(71) Applicant: Central Carolina Hemp Machines, LLC, Clayton, NC (US)

(72) Inventor: Adison Archie, Clayton, NC (US)

(*) Notice: Subject to any disclaimer, the term of this patent is extended or adjusted under 35 U.S.C. 154(b) by 650 days.

(21) Appl. No.: 17/168,097

(22) Filed: Feb. 4, 2021

(65) Prior Publication Data

US 2021/0237093 A1 Aug. 5, 2021

Related U.S. Application Data

(60) Provisional application No. 62/970,078, filed on Feb. 4, 2020.

(51) Int. Cl.
| | |
|---|---|
| A01D 45/06 | (2006.01) |
| A01F 7/02 | (2006.01) |
| A23N 15/00 | (2006.01) |
| B02C 4/08 | (2006.01) |
| B02C 4/30 | (2006.01) |
| B02C 4/42 | (2006.01) |
| B02C 21/02 | (2006.01) |
| B02C 23/10 | (2006.01) |
| F16H 7/12 | (2006.01) |

(Continued)

(52) U.S. Cl.
CPC .............. *B02C 4/08* (2013.01); *A01D 45/065* (2013.01); *A01F 7/02* (2013.01); *A23N 15/00* (2013.01); *B02C 4/30* (2013.01); *B02C 4/42* (2013.01); *B02C 21/02* (2013.01); *B02C 23/10* (2013.01); *F16H 7/1254* (2013.01); *A01G 2003/005* (2013.01); *F16H 2007/0802* (2013.01); *F16H 2007/0865* (2013.01)

(58) Field of Classification Search
CPC .. A01D 45/00–45/30; D01B 1/00–1/50; A24B 1/00–1/10; A24B 5/00–5/16; A01G 5/00–5/06; A01G 17/00–17/18
See application file for complete search history.

(56) References Cited

U.S. PATENT DOCUMENTS

| | | | | |
|---|---|---|---|---|
| 887,519 | A | * | 5/1908 | Reed ............... A01G 17/085 99/626 |
| 1,067,148 | A | * | 7/1913 | Scovill ............... A24B 5/06 131/321 |

(Continued)

FOREIGN PATENT DOCUMENTS

AT 94493 B * 10/1923

OTHER PUBLICATIONS https://youtu.be/rbrhH8TuUJE?list=PLhbenEVpp IQZYE3gUNdCF7e7nfZ4wphud, Nov. 18, 2019. (Year: 2019).*

(Continued)

*Primary Examiner* — Adam J Behrens
*Assistant Examiner* — Madeline I Runco
(74) *Attorney, Agent, or Firm* — Lapple Ubell IP Law, LLP; Matthew C. Lapple

(57) ABSTRACT

A debucking machine, for use with processing industrial hemp or *cannabis*, is provided. Embodiments of the debucking machine include counter-rotating rollers equipped with rubberized combs for gently removing flowers, or "buds," from harvested industrial hemp or *cannabis*. Embodiments of the debucking machine are portable and may be moved from location to location within a drying shed.

33 Claims, 22 Drawing Sheets

(51) Int. Cl.
    *A01G 3/00*           (2006.01)
    *F16H 7/08*          (2006.01)

(56)               References Cited

U.S. PATENT DOCUMENTS

| | | | | |
|---|---|---|---|---|
| 1,840,355 | A * | 1/1932 | Gooch, Jr. | A24B 5/06 |
| | | | | 131/315 |
| 3,927,680 | A * | 12/1975 | Stefan | A01D 46/02 |
| | | | | 460/128 |
| 8,753,180 | B2 * | 6/2014 | Hutchins | A01D 45/16 |
| | | | | 460/134 |
| 10,512,219 | B2 * | 12/2019 | Raichart | A01D 46/247 |
| 10,751,722 | B1 * | 8/2020 | Pearson | B02C 4/42 |
| 11,766,066 | B2 * | 9/2023 | Desmarais | A24B 5/06 |
| | | | | 131/315 |
| 2018/0339298 | A1 * | 11/2018 | Mayers | B03B 4/02 |
| 2021/0007284 | A1 * | 1/2021 | Wilkins | A01F 12/56 |
| 2021/0164129 | A1 * | 6/2021 | VanderZwaag | D01B 1/24 |
| 2021/0169119 | A1 * | 6/2021 | Jasiewicz | A01D 46/28 |

OTHER PUBLICATIONS https://www.youtube.com/watch?v=CySngWeyQqE&list=PLhbenEVppIQZYE3gUNdCF7e7nfZ4wphud&index=14, Jan. 21, 2020. (Year: 2020).*

* cited by examiner

Rubberized Comb Exemplary Material

| Catalog # | 72 |
|---|---|
| Item number: | 10412 |
| Description: | |
| 2 Ply 150 1/8in x 1/16in | |
| International Designation: | |
| N/A | |

| Construction: | |
|---|---|
| Compound Top Cover | Black SBR |
| Color | Black |
| Top Cover Thickness (in) | (3.18 mm) 1/8 in |
| Top Cover Description | Smooth |
| Compound Bottom Cover | Black SBR |
| Bottom Cover Thickness (in) | (1.60 mm) 1/16 in |
| Bottom Cover Description | Smooth |
| Number of Plies | 2 |
| Overall Gauge (in) | (7.15 mm) 9/32 in |
| Unit Weight - lb/PIW | 0.1560 lbs/PIW |
| Carcass Type | Poly/Nylon |
| Compound | Black SBR |
| Temperature Range (°F) - High | 225 °F |
| Temperature Range (°F) - Low | -25 °F |

| Belt Strength: | |
|---|---|
| Tension Rating (PIW) | 150 PIW |

| Pulley Diameter, Minimum | |
|---|---|
| Min. Pulley Dia. - Head @ 80 - 100% Tension | 12.00 in |
| Min. Pulley Dia. - Head @ 60 - 79% Tension | 10.00 in |
| Min. Pulley Dia. - Head @ 59% Tension or Below | 8.00 in |
| Minimum Pulley Diameter - Tail | 8.00 in |

| Splice Instructions: | |
|---|---|
| Splice Step Size | 8.00 in |
| Splice Process | Step Hot |

| Other: | |
|---|---|
| Static Conducting | No |
| Cross Rigid | No |
| High Heat | No |
| Impression Top | No |
| Oil Resistant | No |
| Fire Resistant | No |
| FDA Approved | No |

| Suggested Fasteners: | |
|---|---|
| Flexco Plate/Rivet | #140/R5 |
| Flexco Hinged | #375 or 550 |
| Alligator Staple | N/A |
| Clipper Lace | N/A |
| Alligator Lace | N/A |

Special Characteristics:

This belt is compounded to provide excellent abrasion resistance and flex life and is the best buy for the majority of conveyor belt applications. Its high-tension synthetic fabrics result in minimum stretch, great fastener holding ability, impact resistance and the highest adhesion between plies and cover.

FIG. 23

DEBUCKING MACHINE AND METHOD OF USE

CROSS-REFERENCE TO RELATED APPLICATIONS

This application claims priority to U.S. Provisional Patent Application No. 62/970,078; filed on Feb. 4, 2020, which is incorporated by reference herein in its entirety.

FIELD OF THE DISCLOSURE

The embodiments described herein relate generally to reaping, namely the removal—or "debucking"—of flowers from the stalk of a harvested *cannabis* or hemp plant.

BACKGROUND

For thousands of years, humans have grown, harvested and consumed plant materials for medicinal and recreational purposes. For most of this time, humans have also sought ways to improve their tools for the harvesting process, and to develop particular tools for the harvest and processing of particular plants.

*Cannabis*, also commonly known as marijuana, is a flowering plant that includes three species or sub-species, namely *sativa, indica* and *ruderalis*, though vast numbers of crosses and hybrids now exist as a result of human breeding programs. The plant is indigenous to Central Asia and the Indian Subcontinent. *Cannabis* has long been used for hemp fiber, for oils, for medicinal purposes and as a recreational drug. *Cannabis* plants produce a group of chemicals called cannabinoids. The majority of these compounds are secreted by glandular trichomes that occur abundantly on the floral calyxes and bracts of female *cannabis* plants. These floral calyxes and bracts are typically referred to in the industry, and herein, as "buds" or "flower." When used by humans medicinally or recreationally, *cannabis* can be consumed by a variety of routes, including vaporizing or smoking dried flower buds and leaf portions, resins, extracted oils or waxes.

The most well-known cannabinoid is Delta-9-tetrahydrocannabinol, often abbreviated as "THC." The chemical formula for THC is $C_{21}H_{30}O_2$ and it has the following chemical structure:

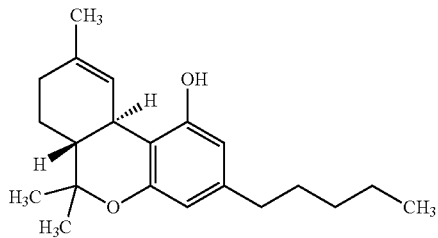 [SMILES: CCCCCc1cc(O)c2c(c1)OC(C)(C)[C@@H]1CCC(C)=C[C@@H]21]

THC is widely recognized as the principal psychoactive constituent in *cannabis*. THC has a very low solubility in water, but good solubility in most organic solvents, specifically lipids and alcohols.

The *cannabis* plant produces hundreds of other cannabinoids, terpenoids and other compounds that are only beginning to be identified, studied and categorized. One generally recognized cannabinoid that has medical efficacy is Cannabidiol ("CBD"). It is a major constituent of the plant, second to THC, and represents up to 40% by weight, in its extracts.

Compared with THC, CBD is not psychoactive in healthy individuals, and is considered to have a wider scope of medical applications than THC, including for epilepsy, multiple sclerosis spasms, anxiety disorders, bipolar disorder, schizophrenia, nausea, convulsion and inflammation, as well as inhibiting cancer cell growth.

It is also believed by many researchers that many of the other cannabinoids, terpenoids and other compounds found in *cannabis* may have important health benefits and/or be capable of treating certain human diseases.

In the early twentieth century, it became illegal in most of the world to cultivate or possess *cannabis*. However, within the last decade, some states and nations have begun to legalize the cultivation, possession and use of *cannabis* for medical purposes. Currently, the use of medical marijuana is decriminalized or legalized in many U.S. states. *Cannabis* is used to reduce nausea and vomiting during chemotherapy, to improve appetite in people with HIV/AIDS, to treat chronic pain, and help with muscle spasms. Other possible medical uses, which are sometimes disputed, include treatment of multiple sclerosis, AIDS wasting syndrome, epilepsy, rheumatoid arthritis, glaucoma, PTSD, depression and generalized anxiety.

Further, within the last ten years, several states in the United States have legalized or decriminalized the cultivation, possession and use of *Cannabis* for recreational purposes. It is therefore estimated by many experts that *cannabis* consumption, for both medical and recreational purposes, will increase over the coming years.

Some varieties of *cannabis* containing a low amount of THC are referred to as "hemp" or "industrial hemp." Under current U.S. law, *cannabis* that has less than 0.3% THC by dry weight is considered to be "hemp" and is not subject to the restrictions of the Controlled Substances Act. Herein, the term "hemp" refers to *cannabis* that has less than 0.3% THC by dry weight.

*Cannabis* or hemp plants may be grown outdoors, in greenhouses, or indoors under artificial light. After growing and flowering, *cannabis* and hemp plants must be harvested. This often involves cutting the entire plant off at the base of the main stalk. Harvested plants can then be dried and cured, or sometimes, further processed shortly after harvest while still "wet." In any event, a normal processing operation is the removal of the flowers or buds from the rest of the harvested plant, in a process generally referred to as "bucking" or "debucking."

In general, the most gentle and preferred method of debucking is by hand, namely having a skilled individual use hand clippers, hand combs, or even fingers, to remove and trim buds from a harvested *cannabis* plant. Normally, hand debucking results in the least damage to buds, the least loss of trichomes from those buds, and the fewest number of stems being included in the final debucked product. However, hand debucking/trimming is understandably slow, results in high labor costs, and is generally incompatible with the mechanized/industrialized approach to farming that has been adopted by most U.S. farmers.

While mechanical debuckers do exist, they generally involve the use of one of two disadvantageous approaches. First, some existing mechanical debuckers use a metal stripping plate with a small hole, and on the backside of that hole, rubberized grippers or belts to grab the thickest (rootside) portion of a stem and then pull a harvested *cannabis* plant stem through the small hole in a stripper plate, thereby stripping the flowers, leaves and many small stems off of the main stalk that was fed into the small hole in the metal stripper plate. Second, some existing mechanical debuckers use hardened "fingers" or tines, or grinders, to rip off, or even completely grind up, buds and sometimes whole stems and plants.

Thus, there is a need in the *cannabis* and hemp farming community for a hemp bucking machine that is able to remove the flower material from the stalk in the same gentle manner that hand bucking treats the flower. Specifically, there is a need for a mechanized debucker that can efficiently and effectively separate, debud and destem the flowers, buds and leaves from *cannabis* and hemp stalks with minimal loss to cannabinoid percentages.

Moreover, there is a need for a mechanical debucker that solves the problem of low productivity hand bucking, poor de-budding quality, low cannabinoid percentage returns and high labor costs of hand bucking.

Further, there is a need for a mechanical debucker that is adjustable so that it can efficiently buck *cannabis* and hemp plants that are different sizes and that have different moisture contents.

Further, there is a need for a mechanical debucker that is mobile, so that it can be moved and used in the field, or in barn rows, so as to increase the flexibility that farmers have for using the device, and further to reduce the distances that harvested *cannabis* plants must be moved, and to minimize handling of them, so as to reduce breakage and loss of biomass, trichomes, and cannabinoids.

Further, there is a need for a mechanical debucker that is durable and reliable.

Accordingly, there is a need for a machine and method for a mechanical debucker for *cannabis* and hemp plants that addresses the issues and disadvantages of known devices and methods discussed above.

SUMMARY

Embodiments of the present invention address the needs described above and relate to a device and method of use for mechanical debucking of *cannabis* and hemp flowers. While no one feature is exclusively responsible for the success of embodiments of the disclosed device and method, persons of ordinary skill should understand the features and advantages of the embodiments of the disclosed device and method upon review of the drawings and detailed description below.

That said, advantages of the embodiments described herein include but are not limited to: (a) the ability to remove the flower material from the stalk in the same gentle manner that hand bucking treats the flower; (b) efficiently and effectively separate, debud and destem the flowers, buds and leaves from *cannabis* and hemp stalks with minimal loss to cannabinoid percentages; (c) solving the problem of low productivity hand bucking, poor de-budding quality, low cannabinoid percentage returns and high labor costs of hand bucking; (d) the ability to adjust the machine and the debucking action so that the mechanical debucker can efficiently buck *cannabis* and hemp plants that are different sizes and that have different moisture contents; (e) mobility, so that the mechanical debucker can be moved and used in the field, or in barn rows, so as to increase the flexibility that farmers have for using the device, and further to reduce the distances that harvested *cannabis* plants must be moved, and to minimize handling of them, so as to reduce breakage and loss of biomass, trichomes, and cannabinoids; and (f) durability and reliability.

The various embodiments of the present debucking machine has several features, no single one of which is solely responsible for its desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments solve the problems discussed in the Background and provide the advantages described herein.

In a first aspect, a *cannabis* and hemp flower debucking machine has a frame, an upper roller rotatably mounted to the frame, where the upper roller has a first rubberized comb with a first plurality of comb teeth, a lower roller rotatably mounted to the frame, where the lower roller has a second rubberized comb with a second plurality of comb teeth, a drive motor, a drive linkage operably connected to the drive motor, where the upper roller is operably connected to the drive motor by the drive linkage so that the upper roller is rotatable in a first direction, where the lower roller is operably connected to the drive motor by the drive linkage so that the lower roller is rotatable in a second direction that is opposite of the first direction, where the upper roller and the lower roller are mounted such that upon rotation of the upper roller in the first direction, and rotation of the lower roller in the second direction, the first plurality of rubberized comb teeth interlace with the second plurality of rubberized comb teeth to establish a debucking zone, whereby the interlace of the first plurality of rubberized comb teeth and the second plurality of rubberized comb teeth in the debucking zone will pull material in the debucking zone toward an interior of the frame, and where the debucking zone is accessible from outside of the frame.

In an embodiment of the first aspect, the first plurality of comb teeth are triangular and the second plurality of comb teeth are triangular.

In another embodiment of the first aspect, the first plurality of comb teeth are lune-shaped and the second plurality of comb teeth are lune-shaped.

In another embodiment of the first aspect, the first plurality of comb teeth are trapezoidal-shaped and the second plurality of comb teeth are trapezoidal-shaped.

In another embodiment of the first aspect, the first plurality of comb teeth are square-shaped and the second plurality of comb teeth are square-shaped.

In another embodiment of the first aspect, the first plurality of comb teeth are finger-shaped and the second plurality of comb teeth are finger-shaped.

In another embodiment of the first aspect, the first plurality of comb teeth and the second plurality of comb teeth are not symmetrically shaped.

In another embodiment of the first aspect, the first plurality of comb teeth are narrow triangular-shaped and the second plurality of comb teeth are wide triangular-shaped.

In another embodiment of the first aspect, the upper roller has between two and eight rubberized combs, each of which has a first plurality of comb teeth, and the lower roller has between two and eight rubberized combs, each of which has a second plurality of comb teeth.

In another embodiment of the first aspect, the upper roller has six rubberized combs, each of which has a first plurality of comb teeth, and the lower roller has six rubberized combs, each of which has a second plurality of comb teeth.

In another embodiment of the first aspect, the debucking machine also has a plurality of wheels, operably affixed to the frame to enable the frame to be moved by rolling the wheels along a surface.

In another embodiment of the first aspect, each of the plurality of wheels is a caster wheel, and each of the caster wheels is swivel-able and lockable.

In another embodiment of the first aspect, the debucking machine has a width, and a height, where the width is between 36 inches and 96 inches and where the height is a maximum of 72 inches.

In another embodiment of the first aspect, the debucking machine has a width, and a height, where the width is approximately 50 inches and the height is 72 inches.

In another embodiment of the first aspect, the debucking machine also has a front conveyor belt roller mounted on the frame at a first position under the upper roller and lower roller, a rear conveyer belt roller mounted on the frame at a second position that is distal from the first position, a conveyor belt mounted on the front conveyor belt roller and the rear conveyer belt roller, and as a result, *cannabis* and hemp flower that is debucked by the interlacing of the first plurality of rubberized comb teeth with the second plurality of rubberized comb teeth will fall onto the conveyor belt at about the first position and may be transported to the second position by the conveyor belt.

In another embodiment of the first aspect, the debucking machine also has a sorting table mounted to the frame in a generally horizontal position, where the sorting table has a proximal side and a distal side, where at least a portion of the proximal side of the sorting table is below the rear conveyor belt roller, so that *cannabis* and hemp flower that is debucked by the interlacing of the first plurality of rubberized comb teeth with the second plurality of rubberized comb teeth will fall onto the conveyor belt at about the first position and may be transported to the second position, and so that the *cannabis* and hemp flower will be deposited onto the sorting table.

In another embodiment of the first aspect, the sorting table is a plate with apertures of varying sizes, where the apertures near the proximal position are smallest and the apertures near the distal position are largest, such that *cannabis* and hemp flower deposited onto the sorting table may drop through the apertures of varying sizes and be sorted by size from smallest to largest.

In another embodiment of the first aspect, the debucking machine also has a shaker mechanism, operably connected to the sorting table for shaking the sorting table, so that the shaking will cause *cannabis* and hemp flower deposited onto the sorting table to migrate across the sorting table from the proximal side to the distal side, such that *cannabis* and hemp flower deposited onto the sorting table may drop through the apertures of varying sizes and be sorted by size from smallest to largest without human intervention.

In another embodiment of the first aspect, the debucking machine also has a removable bin positioned below the upper roller and the lower roller, so that *cannabis* and hemp flower that is debucked by the interlacing of the first plurality of rubberized comb teeth with the second plurality of rubberized comb teeth will fall into the removable bin.

In another embodiment of the first aspect, the drive linkage is a drive chain.

In another embodiment of the first aspect, the drive linkage is a drive belt.

In another embodiment of the first aspect, the drive motor and drive linkage are configured to drive the upper roller and the lower roller to at least 60 revolutions per minute.

In another embodiment of the first aspect, the drive motor is a variable speed motor, such that the drive linkage can drive both the upper roller and the lower roller at a first rolling speed, and that first rolling speed is between 80 and 120 revolutions per minute.

In another embodiment of the first aspect, the first plurality of comb teeth are approximately 3 inches in length.

In another embodiment of the first aspect, the first plurality of comb teeth are approximately 6 inches in length.

In another embodiment of the first aspect, the first plurality of comb teeth are between 3 and 6 inches in length.

In another embodiment of the first aspect, the first plurality of comb teeth are all uniform in length.

In another embodiment of the first aspect, the first plurality of comb teeth are not uniform in length.

In another embodiment of the first aspect, the first plurality of comb teeth is conventional conveyor belt material.

In another embodiment of the first aspect, the first plurality of comb teeth is a substrate coated with a styrene butadiene rubber In another embodiment of the first aspect, the substrate is a poly/nylon blend.

In another embodiment of the first aspect, the styrene butadiene rubber coating is at least 1/16 inches thick.

In another embodiment of the first aspect, the first plurality of comb teeth has a first side and a second side, where the styrene butadiene rubber coating of the first side is 1/16 inches thick and the styrene butadiene rubber coating of the second side is 1/8 inches thick.

In another embodiment of the first aspect, the upper roller has a first rotational position, the lower roller has a second rotational position, where a roller offset angle is the angle between the first rotational position and the second rotational position, and where the first rotational position and the second rotational position may be adjusted with respect to each other by changing the roller offset angle.

In another embodiment of the first aspect, the debucking machine also has a spring drive linkage tensioner operably affixed to the frame, where the spring drive linkage tensioner is biased to tension the drive linkage, where the spring drive linkage tensioner may be actuated to release tension on the drive linkage, such that the lower roller may be rotated to adjust the second rotational position of the lower roller.

In another embodiment of the first aspect, each of the first plurality of comb teeth has a first tip and a first crotch, and each of the second plurality of comb teeth has a second tip and a second crotch, so that the interlacing of the first plurality of comb teeth and the second plurality of comb teeth has an interlace tolerance that is defined by the distance between the first tip and the second crotch at their closest point during a revolution of the upper roller and a revolution of the lower roller, and so that the interlace tolerance is adjustable by adjustment of the first rotational position and second rotational position, and when the rotational offset angle is zero degrees the interlace tolerance is less than 0.3 inches.

In another embodiment of the first aspect, the roller offset angle is set to zero degrees, thus resulting in a more aggressive debucking action for "wet" *cannabis* and hemp flower.

In another embodiment of the first aspect, the roller offset angle is set to fifteen degrees, thus resulting in a moderately aggressive debucking action for "moderately dry" *cannabis* and hemp flower.

In another embodiment of the first aspect, the roller offset angle is set to thirty degrees, thus resulting in a less aggressive debucking action for "very dry" *cannabis* and hemp flower.

In a second aspect, a method of hemp flower debucking is provided, using a debucking machine that has a frame, an upper roller rotatably mounted to the frame, where the upper roller has a first rubberized comb with a first plurality of comb teeth, a lower roller rotatably mounted to the frame, where the lower roller has a second rubberized comb with a second plurality of comb teeth, a drive motor, a drive linkage operably connected to the drive motor, where the upper roller is operably connected to the drive motor by the drive linkage so that the upper roller is rotatable in a first direction, where the lower roller is operably connected to the drive motor by the drive linkage so that the lower roller is rotatable in a second direction that is opposite of the first direction, where the upper roller and the lower roller are mounted such that upon rotation of the upper roller in the first direction, and rotation of the lower roller in the second direction, the first plurality of rubberized comb teeth interlace with the second plurality of rubberized comb teeth to establish a debucking zone, so that the interlace of the first plurality of rubberized comb teeth and the second plurality of rubberized comb teeth in the debucking zone will pull material in the debucking zone toward an interior of the frame, and where the debucking zone is accessible from outside of the frame via an opening, the method of debucking including the actions of engaging the drive motor such that the upper roller is rotating in the first direction and the lower roller is rotating in the second direction, selecting a harvested hemp plant that comprises a main stalk, branches, and hemp flowers on at least some of the branches, holding the harvested hemp plant by the main stalk, while maintaining a hold on the main stalk, inserting the branches and hemp flowers portions of the harvested hemp plant into the debucking zone, moving the harvested hemp plant laterally within the debucking zone, drawing the harvested hemp plant most of the way out of the debucking zone, assessing whether the harvested hemp plant has been sufficiently debucked, and when the user has assessed that the harvested hemp plant has been sufficiently debucked, withdrawing the harvested hemp plant from the debucking zone.

BRIEF DESCRIPTION OF THE DRAWINGS

In the descriptions that follow, like parts or steps are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 23 is an exemplary specification sheet for the conventional rubberized conveyor belt material which may be used to manufacture the rubberized comb teeth addressed herein.

DETAILED DESCRIPTION OF THE EMBODIMENTS

The description that follows is presented to enable one skilled in the art to make and use the present invention, and is provided in the context of a particular application and its requirements. Various modifications to the disclosed embodiments will be apparent to those skilled in the art, and the general principles discussed may be applied to other embodiments and applications without departing from the scope and spirit of the invention. Therefore, the invention is not intended to be limited to the embodiments disclosed, but the invention is to be given the largest possible scope which is consistent with the principles and features described herein.

Embodiments disclosed herein relate to a device and method of use for a mechanical debucker for harvested *cannabis* and hemp plants.

While the embodiments of the device disclosed in the figures will be readily understandable by persons of ordinary skill in the art, a further comment on certain components of the device is provided as follows.

There is a need in the industrial hemp farming community for a hemp bucking machine that is able to remove the flower material from the stalk in the same gentle manner that hand bucking treats the flower. With this purpose in mind embodiments disclosed herein efficiently and effectively separate, debud and destem the flowers, buds and leaves from the *cannabis* and hemp stalks with minimal loss to cannabinoid percentages. The combing action of the embodiments disclosed herein closely mimics the process of hand bucking the flower from the hemp stalk. The gentle deflowering process of the embodiments disclosed herein significantly reduces cannabinoid losses by using the combing action with no crushing or thrashing damage to the flower. The embodiments disclosed herein have been proven to remove the flower with less than 0.5-1% loss in the cannabinoid profile, in comparison to about a 3.5 to 4.5% loss in current processes with existing equipment.

The mechanical bucker embodiments disclosed herein also solve the problems of low productivity, poor de-budding quality, low cannabinoid percentage returns and high labor costs of hand bucking.

Figure 1:
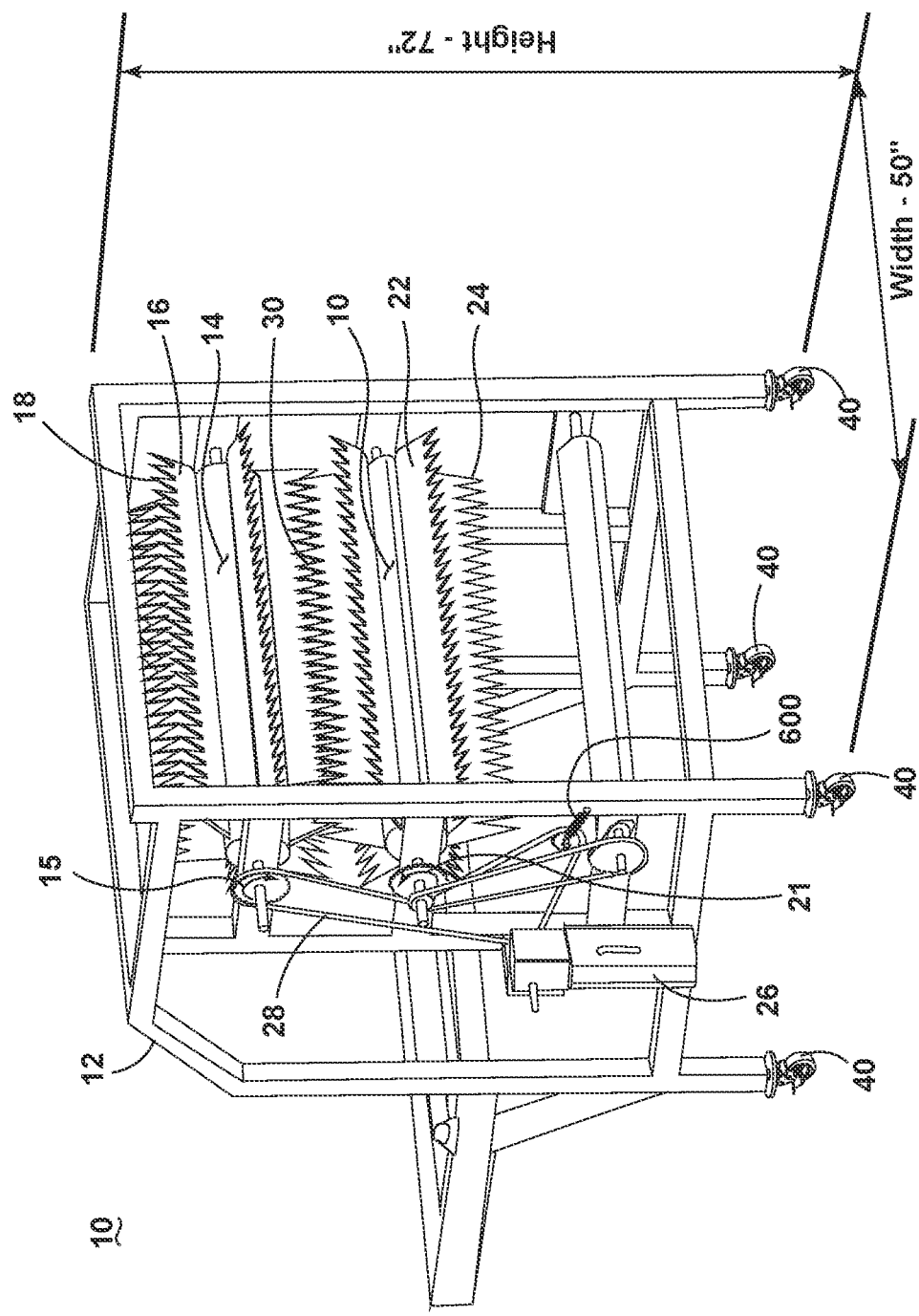
FIG. 1 is a schematic front perspective view of an embodiment of the *cannabis* flower debucking machine disclosed herein.
Figure 2:
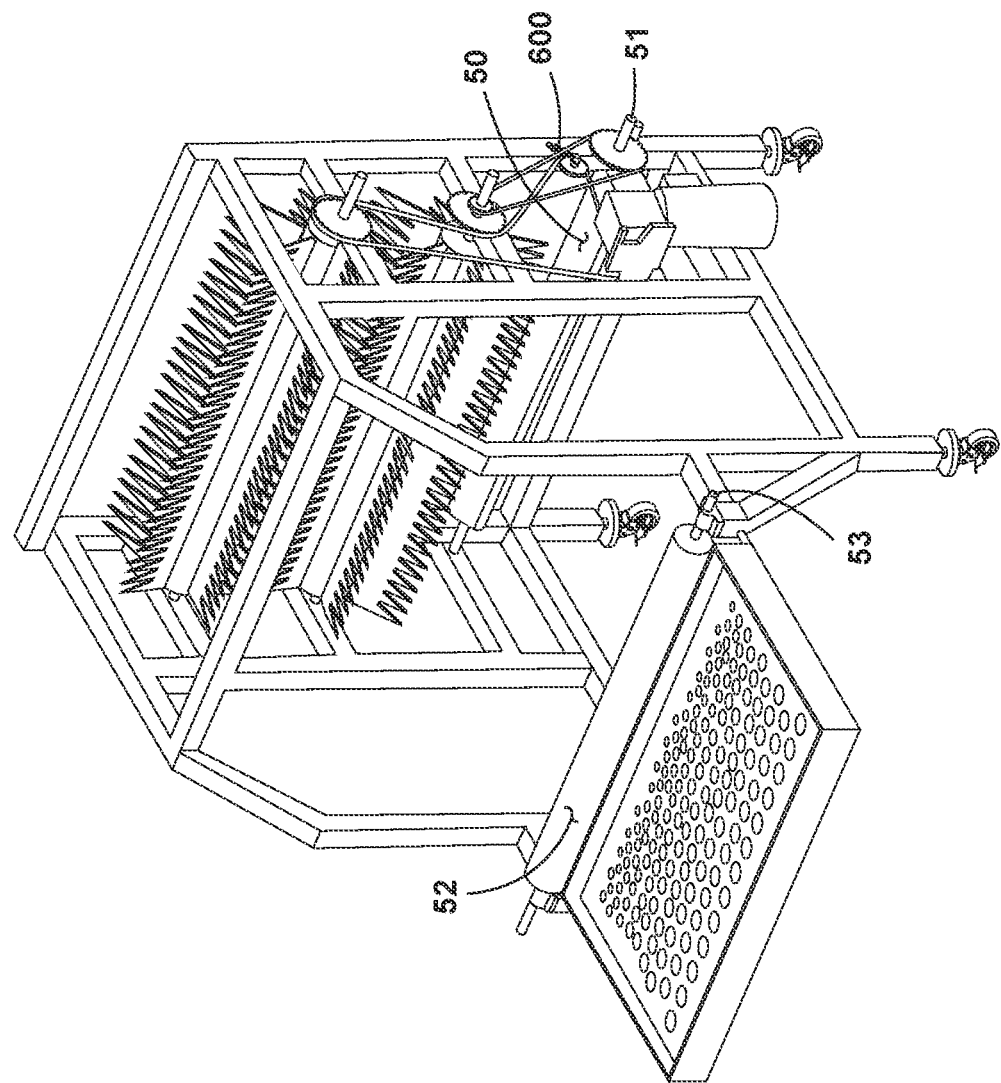
FIG. 2 is a schematic top rear perspective view of the embodiment of FIG. 1, with the output conveyor belt omitted to improve understanding and viewing.
Figure 2A:
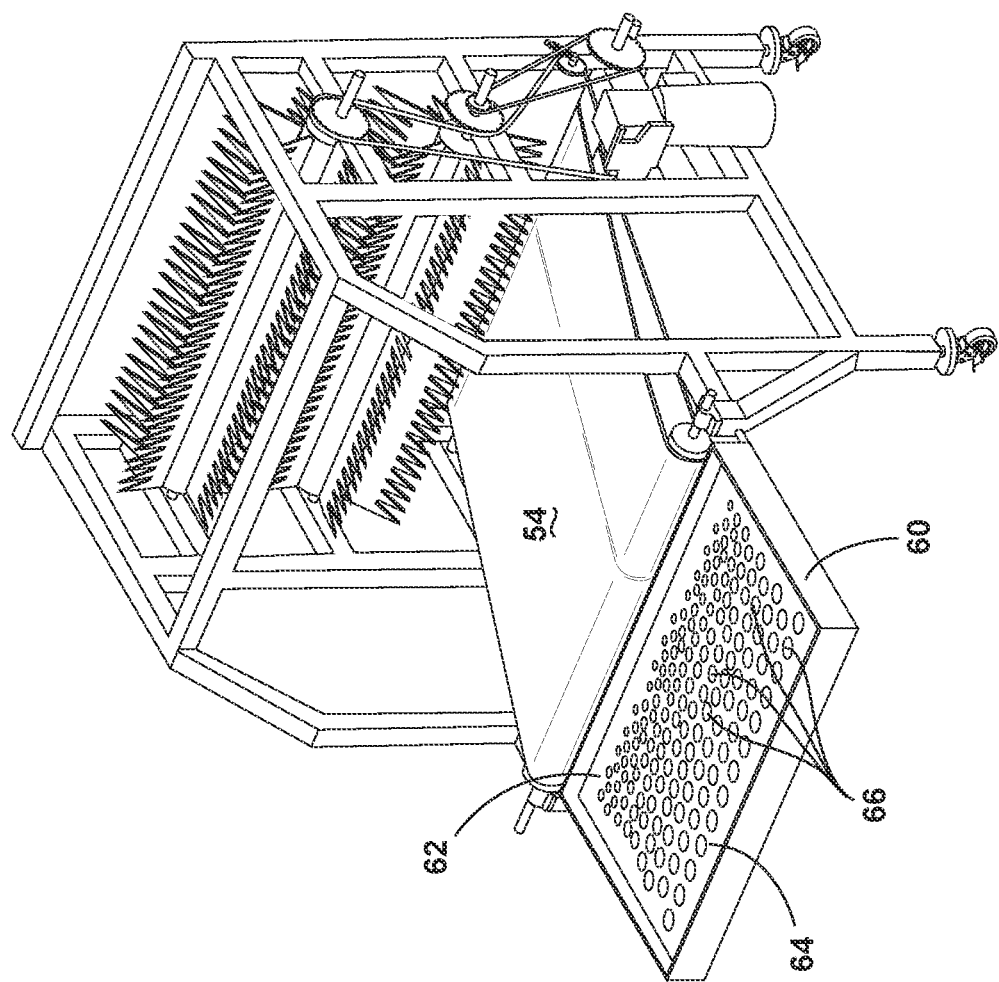
FIG. 2A is a schematic top rear perspective view of the embodiment of FIG. 1, with the output conveyor belt shown.

With reference to FIGS. 1-2A, an embodiment of the debucking machine 10 is illustrated. The debucking machine 10 includes a frame 12, an upper roller 14 rotatably mounted to the frame 12. The upper roller 14 has at least one, and preferably six, rubberized combs 16, each of which as a plurality of comb teeth 18. Similarly, a lower roller 20 is rotatably mounted to the frame 12 below the upper roller 14. The lower roller 20 has at least one, and preferably six, rubberized combs 22, each of which has a plurality of comb teeth 24. In various embodiments the upper roller 14 has between two and eight rubberized combs and the lower roller 20 has between two and eight rubberized combs. The debucking machine 10 includes a drive motor 26, and a drive linkage 28 operably connected to the drive motor 26, the upper roller 14 and the lower roller 20. The drive linkage 28 and the sprockets of the rollers are configured so that the upper roller 14 is rotatable in a first direction, 15 and the lower roller 20 is rotatable in a second direction 21 that is opposite of the first direction, i.e., the rollers are counter-rotating with respect to one another, and their respective directions of rotation are inward. This configuration, when the debucking machine 10 is activated, will cause the upper roller 14 and the lower roller 20 to counter-rotate, such that the plurality of rubberized comb teeth 18, 24 interlace at their closest point, and thus establish a debucking zone 30. In the debucking zone 30, the interlace of the combs will pull plant material in the debucking zone 30 toward an interior 32 of the frame 12. When a harvested hemp plant is held in place by an operator, typically by the main stem of the harvested hemp plant, the action of the rubberized combs 16, 22 in the debucking zone 30 will gently remove the hemp flowers—sometimes referred to herein as "buds"—from the stems of the harvested hemp plant, generally without breaking the stems. As such, the commercially valuable buds can be efficiently and quickly removed and separated from the stems.

The drive linkage 28 may be either a drive chain or a drive belt. Preferably, the drive motor 26 is a variable speed electric motor. All power driven components are connected by a chain or belt to a single electric motor with a gear reducer. The motor is controlled with a speed and overload driver (variable frequency driver or "VFD"), to adjust the rate of infeed, and to adjust the device for use with different sizes of plants, and with plants of different moisture content.

The disclosed embodiments also provide for maneuverability and power flexibility. Knowing that most farmers harvest, dry and/or store hemp plants in multiple barn locations, mainly barns in rows, the device includes solid and pneumatic casters for ease of movement. Power flexibility is also provided, by a multi-power input variable frequency driver (VFD) with input voltages of 110V to 220 volts to drive the single electric motor.

The debucking machine 10 has a plurality of wheels 40, operably affixed to the frame 12 to enable the machine to be moved by rolling the wheels 40 along a surface. Preferably each of the wheels 40 is a pneumatic caster wheel, and each of the caster wheels is swivel-able and lockable. The inclusion of wheels 40 enables the debucking machine 10 to be moved from location to location, such as within a drying shed. Due to the sometimes brittle nature of dried hemp, it is often advantageous to move the dried hemp plants as little as possible, to minimize breakage and loss of the buds. Thus, by moving the debucking machine to a location that is close the dried hemp, such breakage can be minimized.

The portability and mobility of the debucking machine 10 is also enabled by its relatively modest size. In one embodiment the debucking machine 10 has a width, and a height, where the width is between 36 inches and 96 inches and where the height is a maximum of 72 inches. In a preferred embodiment, the width is approximately 50 inches and the height is 72 inches. These dimensions make the debucking machine small enough to transport on a small trailer or pickup truck. These dimensions also enable the debucking machine 10 to be wheeled into a drying shed, and wheeled along the rows of drying hemp plants, when it is time for the drying hemp plants to be debucked. This portability and accessibility is not possible with larger "trailer-tractor" sized hemp debuckers.

The debucking machine 10 also has a front conveyor belt roller 50 mounted on the frame 12 at a first position 51 under the upper roller 14 and lower roller 20, a rear conveyor belt roller 52 mounted on the frame 12 at a second position 53 that is distal from the first position, and a conveyor belt 54 mounted on the front conveyor belt roller 50 and the rear conveyor belt roller 52. As a result, *cannabis* and hemp flower that is debucked by the interlacing of the rubberized comb teeth of the upper and lower rollers will fall onto the conveyor belt 54 at about the first position 51 and may be transported to the second position 53 by the conveyor belt 54.

Figure 9:
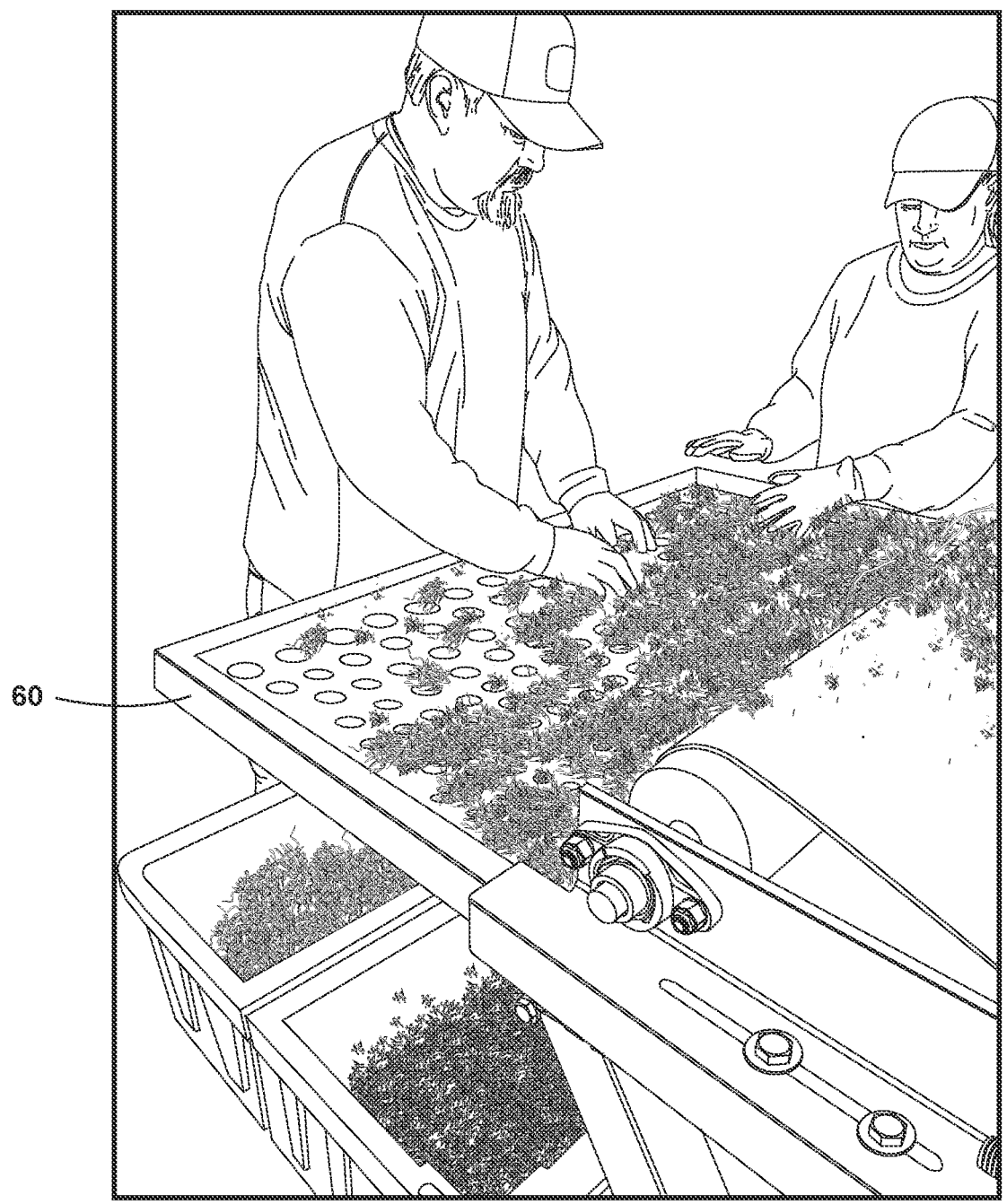
FIG. 9 is a view of an embodiment of the debucking machine in operation, showing a close up of the conveyor belt at the rear of the device conveying debucked buds from the debucking zone toward and onto the sorting table, while workers hand sort buds by size using the apertures of the sorting table to cause different sized buds to fall into two different bins below the sorting table.

The debucking machine 10 also has a sorting table 60 mounted to the frame 12 in a generally horizontal position, where the sorting table 60 has a proximal side 62 and a distal side 64, where at least a portion of the proximal side 62 of the sorting table 60 is below the rear conveyor belt roller 52, so that *cannabis* and hemp flower that is debucked and then transported by the conveyor belt 54 will be deposited onto the sorting table 60. In some embodiments, the sorting table 60 is a plate with apertures 66 of varying sizes, where the apertures 66 near the proximal side 62 are smallest and the apertures near the distal side 64 are largest, such that *cannabis* and hemp flower deposited onto the sorting table may drop through the apertures 66 of varying sizes and be sorted by size from smallest buds to largest buds. Sorting may be assisted by hand sorting by one or more operators, as shown in FIG. 9.

In an alternative embodiment, the debucking machine 10 also has a shaker mechanism, operably connected to the sorting table for shaking the sorting table, so that the shaking will cause *cannabis* and hemp flower deposited onto the sorting table to migrate across the sorting table 60 from the proximal side 62 to the distal side 64, such that *cannabis* and hemp flower deposited onto the sorting table 62 may drop through the apertures 66 of varying sizes and be sorted by size from smallest bud to largest bud without human intervention.

In an alternative embodiment, the debucking machine 10 does not have a conveyor belt, but simply has a removable bin positioned below the upper roller and the lower roller, so that *cannabis* and hemp flower that is debucked by the will fall into the removable bin. (See FIG. 6).

Figure 3:
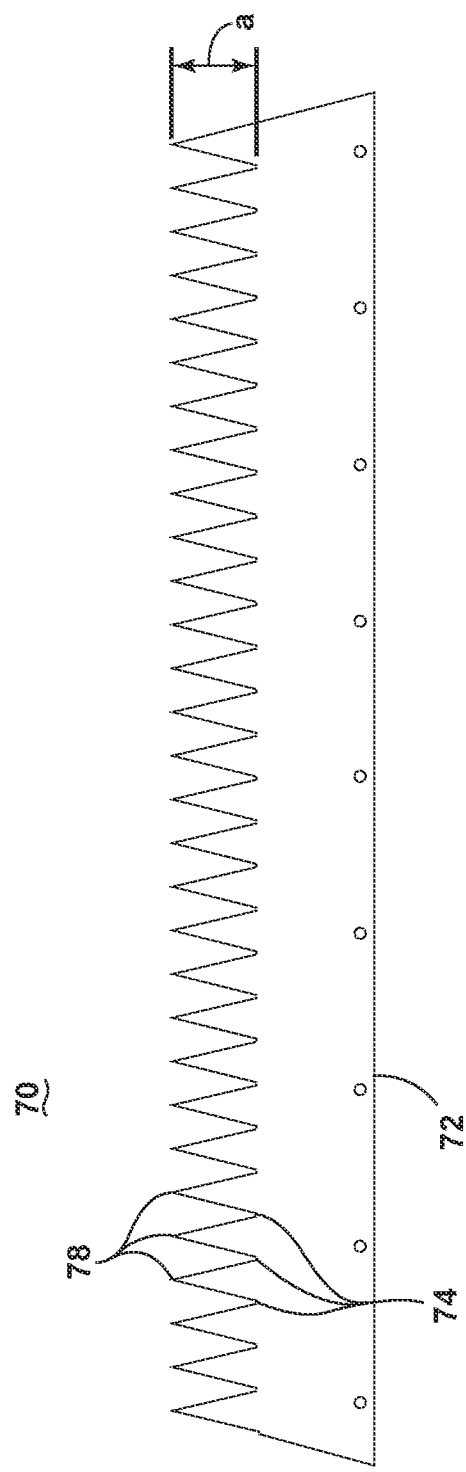
FIG. 3 is a schematic front view of a first embodiment of a flexible triangular tooth comb, with short triangular tines of length "a," which may be used with the embodiment of FIG. 1.
Figure 4:
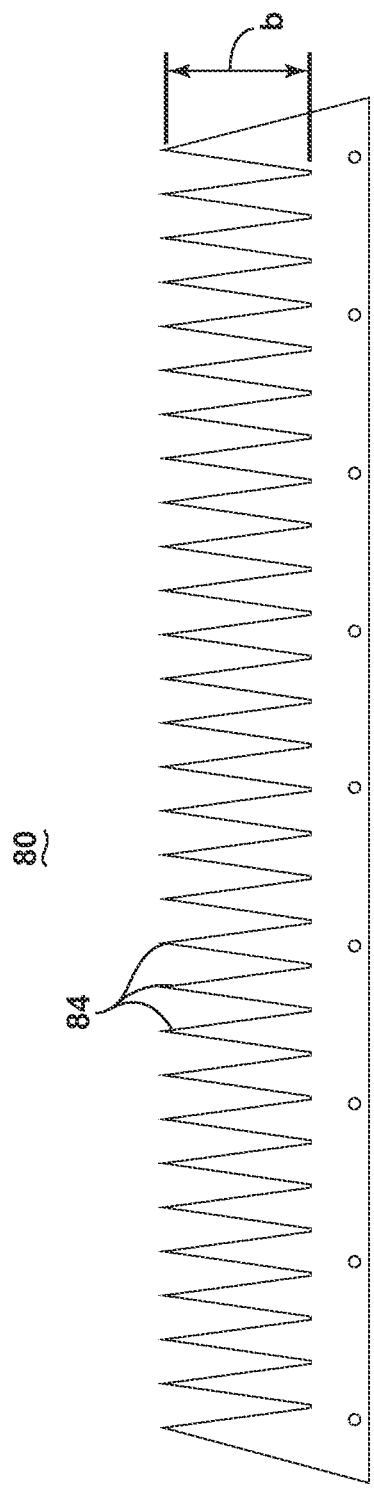
FIG. 4 is a schematic front view of a second embodiment of a flexible triangular tooth comb, with long triangular tines of length "b," which may be used with the embodiment of FIG. 1.

With reference to FIGS. 3 and 4, two different embodiments of a rubberized comb are illustrated. In FIG. 3, the rubberized comb 70 has a base distance—the distance from the base 72 to the lowest crotch 74 of about 1.5 inches. The rubberized comb 70 has a plurality of short triangular teeth 78, each of which is about three inches long, a measured at "a." In FIG. 4, the rubberized comb 80 has the same base distance, but has longer triangular teeth 84, each of which is five inches long, measured at "b."

In general, the length of the teeth may vary depending upon the type of hemp to be processed and its moisture content. The length of teeth may be as short as three inches to as long as 12 inches. In a preferred embodiment, the length of teeth are between 3-6 inches. Shorter teeth are more aggressive for wet material and longer teeth are less aggressive. Longer teeth tend to bend more and are more forgiving on dry material. In some embodiments, the length of teeth on a particular comb are all the same length. In some embodiments, the length of the teeth on a particular comb are different lengths. In some embodiments, the combs on the upper roller are symmetrical to the combs on the lower rollers. In other embodiments, the combs are asymmetrical. In each case, the user may utilize combs of the size, length, shape and symmetricity that best suits his needs for the hemp that he is debucking.

Figure 6:
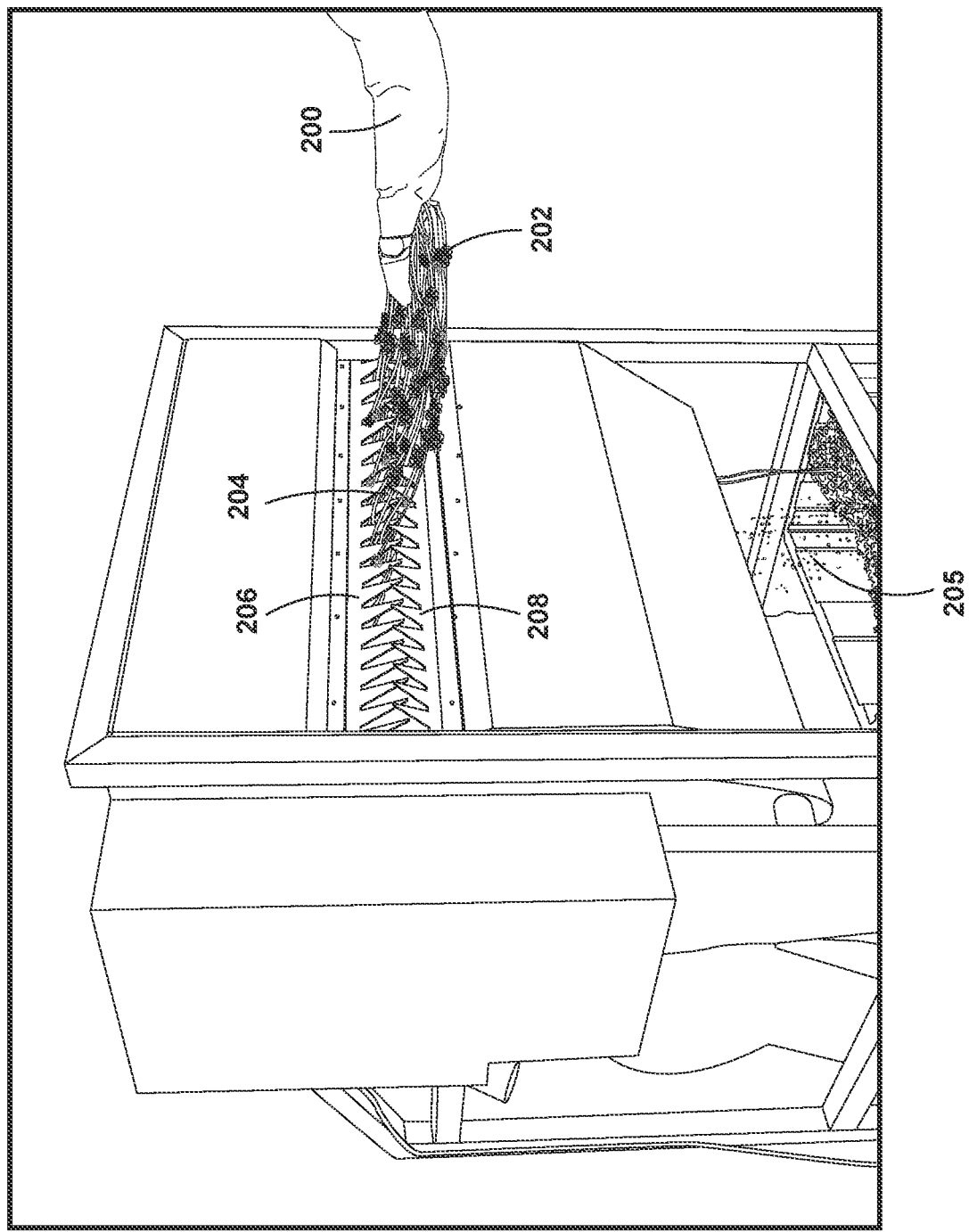
FIG. 6 is a left front perspective view of another embodiment of the *cannabis* debucker disclosed herein, with the device in operation, showing an operator beginning to feed a harvested hemp plant into the front of the debucker so that it is in contact with the flexible combs of the upper and lower counter-rotating rollers.
Figure 7:
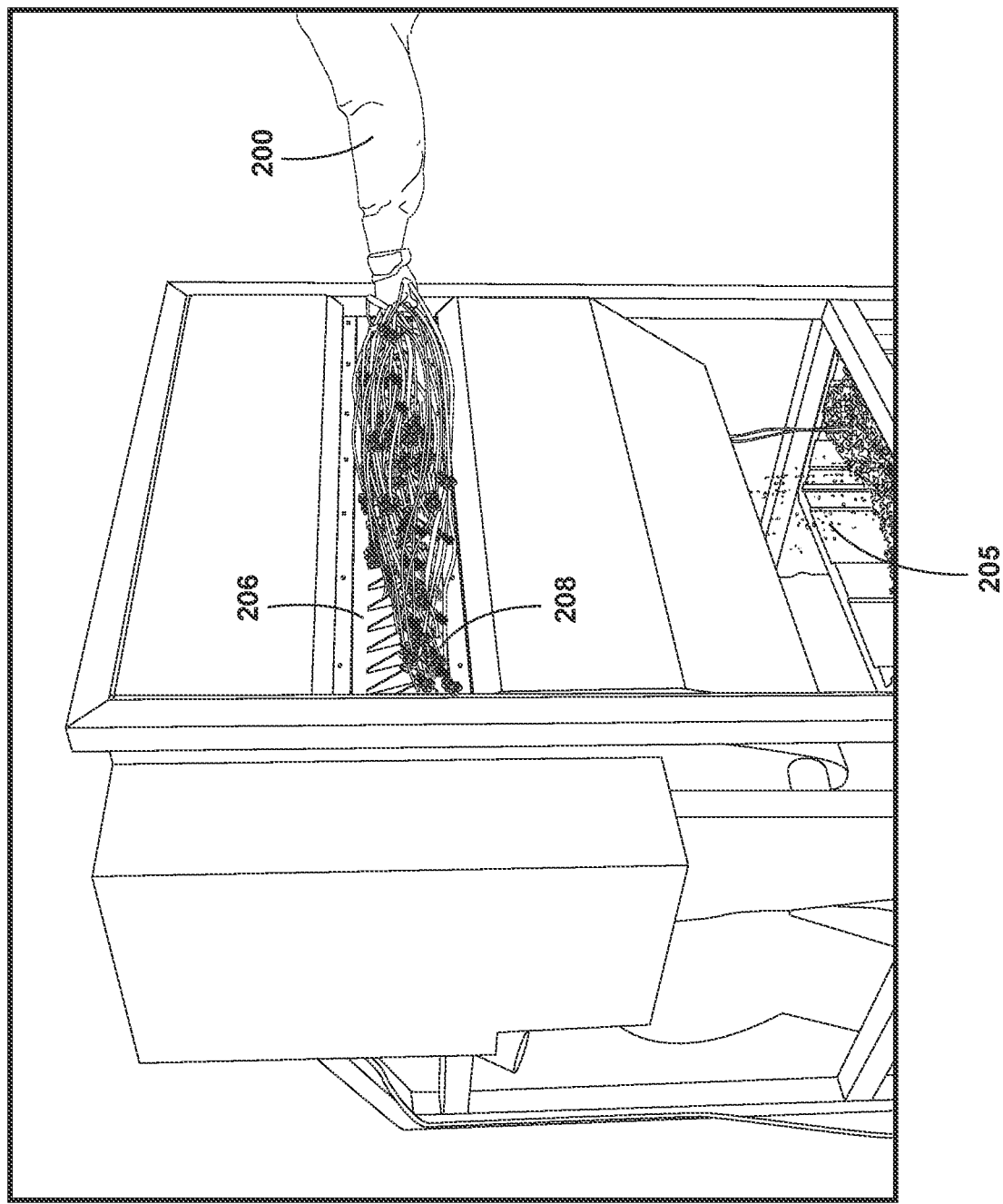
FIG. 7 is a left front perspective view of the embodiment of FIG. 6 in operation, showing the operator drawing the harvested hemp plant back at the left side of the opening, while the flexible combs of the upper and lower counter-rotating remove buds.

The process performed by the disclosed embodiments is to comb the hemp plants with rubber teeth ranging in size from three to five inches in length, as illustrated in FIGS. 6-7. The teeth are on two rollers that counter-rotate inwards from the front of the device, allowing the teeth to interlock (either partially or fully) and to fully remove all buds and flowers from the hemp stalk.

Figure 5:
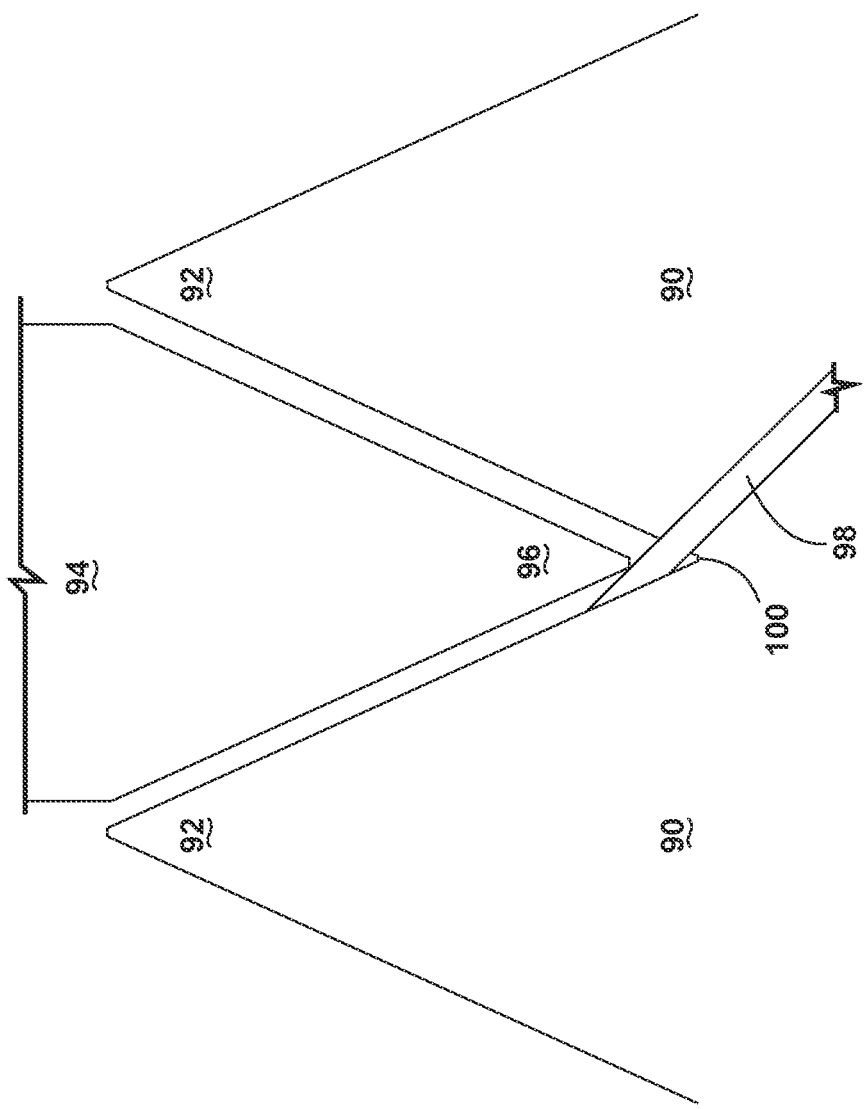
FIG. 5 is a schematic close-up of two flexible triangular toothed combs, from an upper roller, and from a lower roller, at the point where the toothed combs approach one another most closely, thereby causing a *cannabis* stem to be pushed down into the "v"—or crotch—of the lower triangular comb in order to gently remove buds.

This interlacing process is illustrated in further detail in FIG. 5. A lower rubberized comb 90, shown in partial view, has triangular teeth 92. An upper rubberized comb 94, shown in partial view, has symmetric triangular teeth 96. In FIG. 5, the teeth 92, 96 are illustrated at an instant in time when they reach their closest point of approach, namely when the counter-rotating rollers are positioned and adjusted so that the teeth 92, 96 interlace and nearly interlock. As explained below, other interlace positions, based on different tooth sizes and shapes, as well as based on different roller timing adjustments, are possible for either more or less aggressive debucking. All such positions are referred to herein as "interlacing", even if the teeth of the upper and lower comb rollers do not actually touch or interlock.

The triangular teeth 92, 96 are advantageous because they interlock with each other and push the hemp stem 98 down into the "v" part of the triangle, otherwise referred to herein as a crotch 100. Once the teeth 92, 96 interlock with each other the stem 98 is almost completely surrounded with the comb material and the stem 98 is raked clean of flowers and buds. The combs can be timed to completely interlock with each other, passing by each other at the exact same time, which causes the combing action to be more aggressive and the most amount pulling power is achieved at this setting. This setting is useful for very full, wet plants. Alternatively, the comb teeth may be offset by loosening the drive chain and moving the sprocket forward on the upper comb one or more chain links. This allows the process to be less aggressive and works better on plants with moisture less than 12%. Speed is a factor on dry plants, as less speed will reduce the amount of breakage on plant stems. Plants with little foliage will benefit from a higher speed, bucking time will be reduced and production will be at the maximum.

The speed of rotation of the upper roller and lower roller can be set at any speed between 60-150 rotations per minute (rpm) for bucking. A preferred embodiment is between 80-120 rpm. This reduces the fatigue on the operator feeding the hemp plants into the machine. Slower speeds tend to pull hard on the stems, breaking them. At such lower speeds the operator fatigues more quickly reducing output of flower and buds.

Each comb roller may have between two and six rows of rubberized teeth. The six rows allow enough room to remove and replace the combs as needed.

With reference to FIGS. 6-9, the operation of embodiments of the disclosed mechanical debucker is illustrated. The worker 200 holds the hemp stalk base 202 in hand and inserts the foliage end 204 between the counter-rotating comb rollers, 206, 208 then slowly pulls the plant backwards out of the machine to remove the hemp stalk 202 as the flower material is removed by the counter-rotating comb rollers. All of the removed flower material then falls into a bin 205 (in some embodiments, see FIGS. 6-8) or onto a conveyor belt below and is carried to the back of the machine and dropped onto a sorting table (see FIG. 9). The material that lands on the sorting table is moved around by hand as it falls through the array of holes in the table into bins located below. Any excess stems and small branches are then collected and removed from the sorting table.

While it is also possible to mechanize the input feed to the debucker disclosed herein, the applicant currently believes that the handheld approach described above is preferred. Specifically, the handheld approach allows the operator to regulate the input feed of the plant. If the operator puts the plant in quickly it reduces the amount of plant material lost and dropped around the base of the machine on the floor. Once the plant is inserted, a side to side (left and right motion) with a slow pull back out of the machine is generally the best and fastest way to buck the plant. Moreover, because every plant is different and unique, the operator can change any of these operations to best buck each plant efficiently. The hand held operation also allows for less material movement (picking up, shaking, tractor movement, any type of extra process to get the harvested hemp plant to the machine) which will minimize biomass falling off on the ground and lost. In normal operation, the debucker is placed in the drying room, and the harvested and dried plants are taken out of the drying racks by the operator and then immediately inserted into the hemp bucker reducing loss and labor time. The debucker can then be moved as drying racks are emptied.

Figure 8:
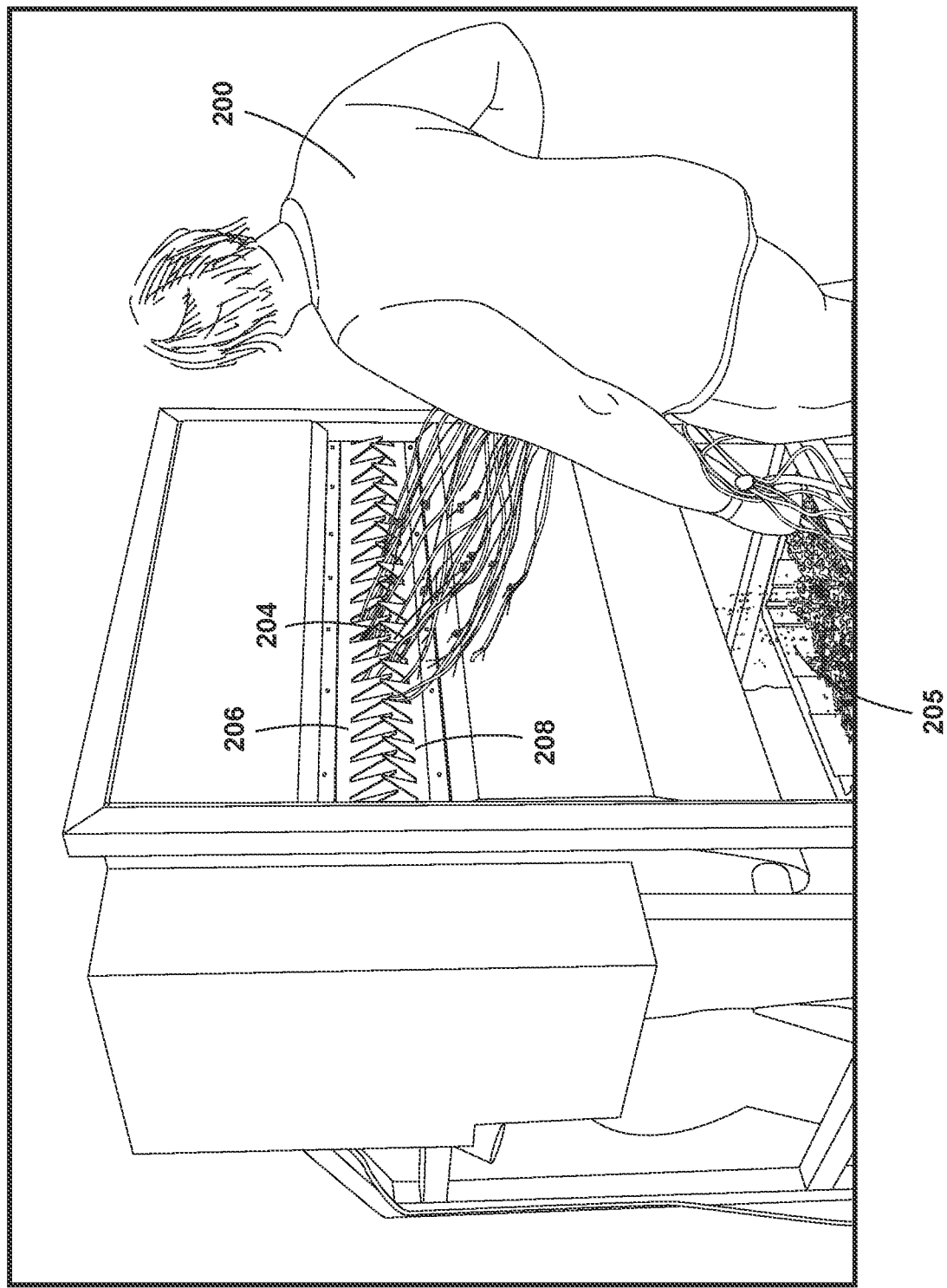
FIG. 8 is a left front perspective view of the embodiment of FIG. 6 in operation, showing the operator drawing back the harvested hemp plant at the middle of the opening after the majority of its buds have been debucked.

With reference to FIG. 8, the gentle nature of the debucking process performed by embodiments disclosed herein is illustrated. Specifically, FIG. 8 shows a nearly full and unbroken hemp plant stem, which has been completely debucked or stripped of all flowers and leaves. However, the debucking process did not result in significant breakage of either the major stems or even most of the smaller branches, of the dried hemp plant. As a result, this means that the flowers suffered less breakage or damage, resulting in preserving larger buds and having fewer dislodged trichomes from those buds. Further, it means that there are fewer unwanted broken stems in the resultant outflow stream that is conveyed to the sorting table by the conveyor belt.

Figure 10:
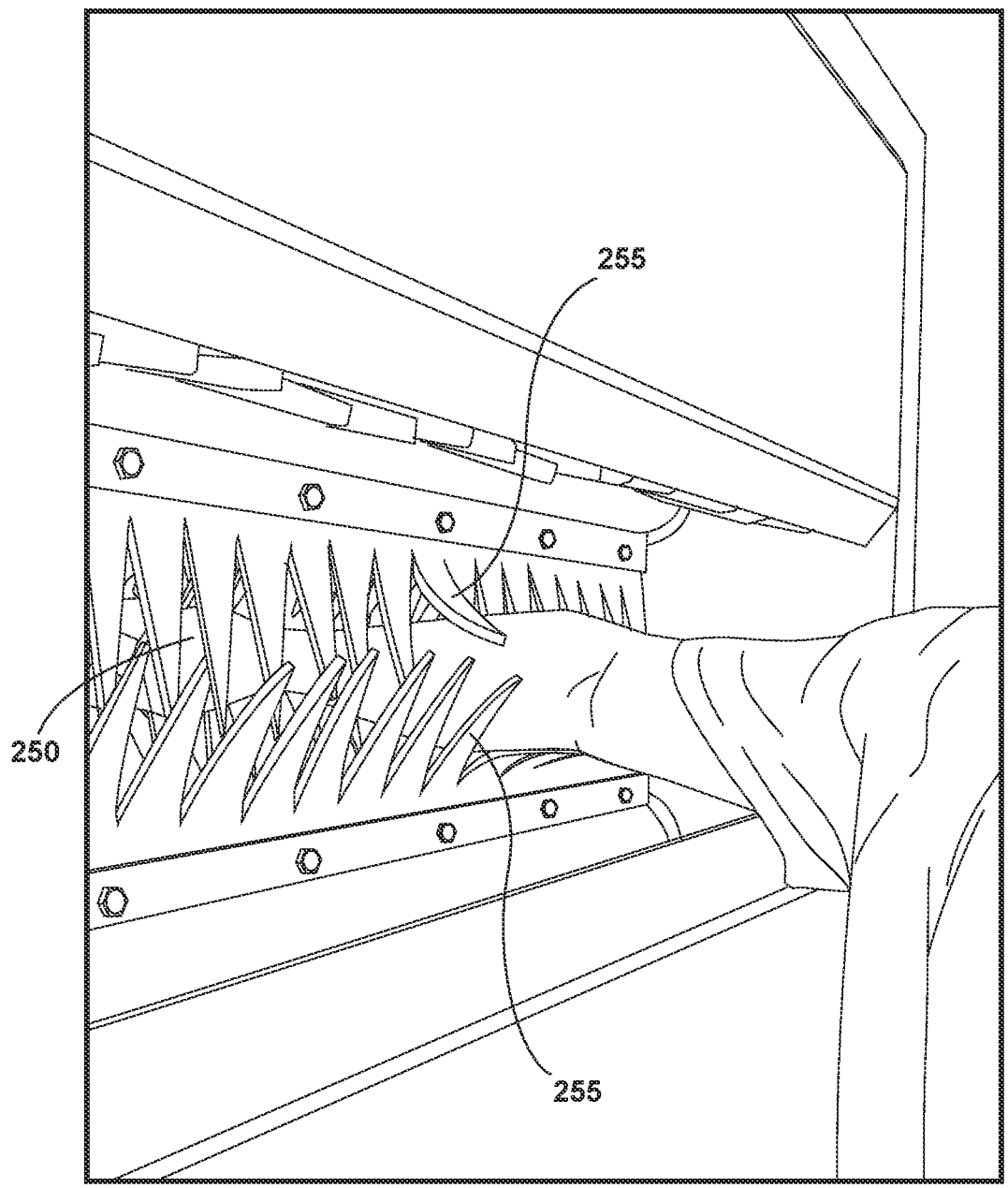
FIG. 10 is a view of an embodiment of the debucker device in operation, to illustrate the safety features of the device, namely, that if an operator accidently inserts his hand into the debucking zone while the flexible rubberized combs of the counter-rotating rollers are rotating, the flexible rubberized combs are designed such that they will not generally cut, bruise, entangle, or otherwise harm the operator's accidently placed hand.

FIG. 10 further illustrates the gentle nature of the debucking process performed by embodiments disclosed herein. As shown, the counter-rotating operation of the rubberized comb rollers is gentle enough that an operator can insert his hand and arm 250 between the comb rollers 255 during operation without any significant injury.

While applicant does not recommend—and in fact recommends against—inserting hands 255 into any mechanical device while it is in operation, FIG. 10 further illustrates an additional advantage of the present embodiments, namely that it is safer in its operation. In the event that an operator slips or accidentally inserts his hand into the counter-rotating comb rollers 255, in most instances his hand will not be harmed. This is in stark contrast to most other farm machinery that utilizes metal tines or cutting blades to reap and harvest crops, and which would cause severe injury if a farm worker inserted his hand into such a conventional farm machine.

Figure 11:
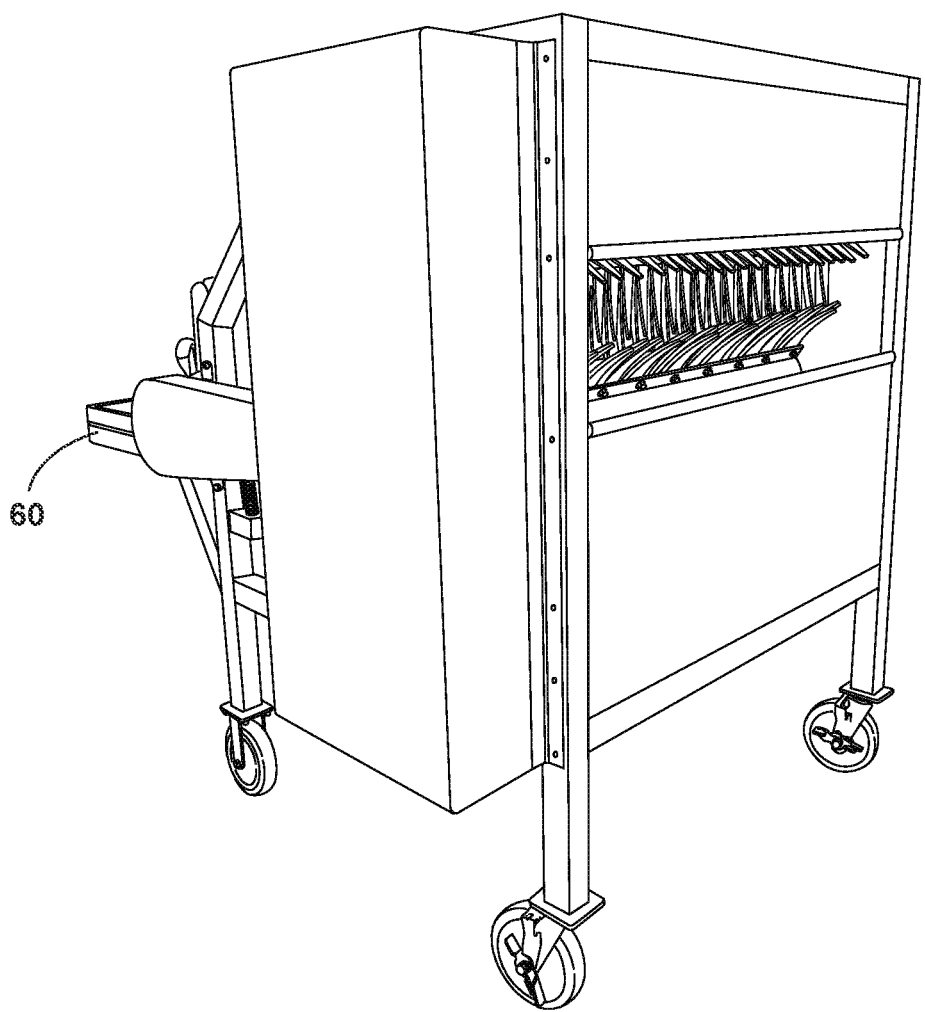
FIG. 11 is a front perspective view of another embodiment of the debucking machine, with all operating guard panels in place.
Figure 12:
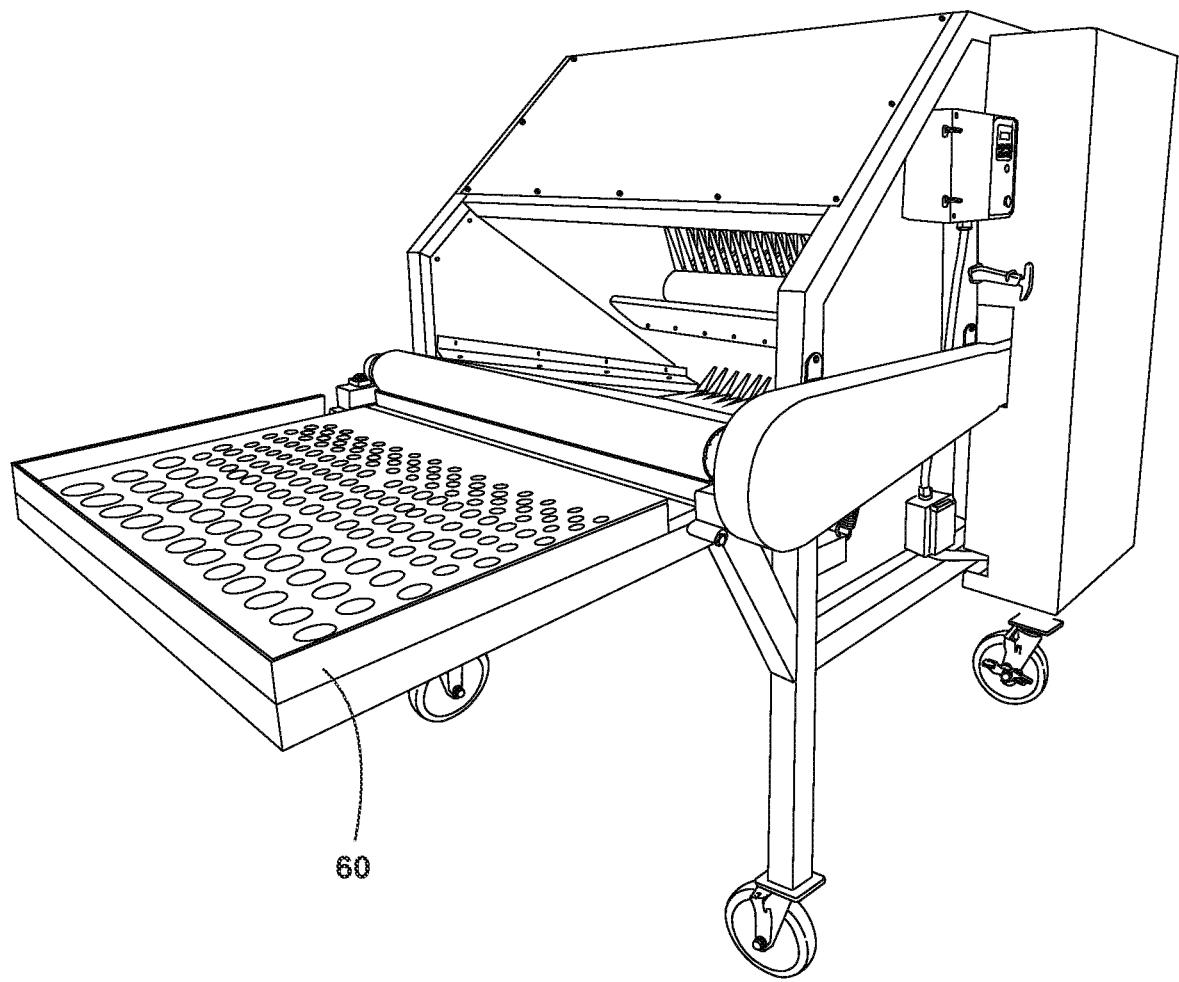
FIG. 12 is a rear perspective view of the embodiment of FIG. 11, illustrating the sorting table in a folded-down operating position.
Figure 13:
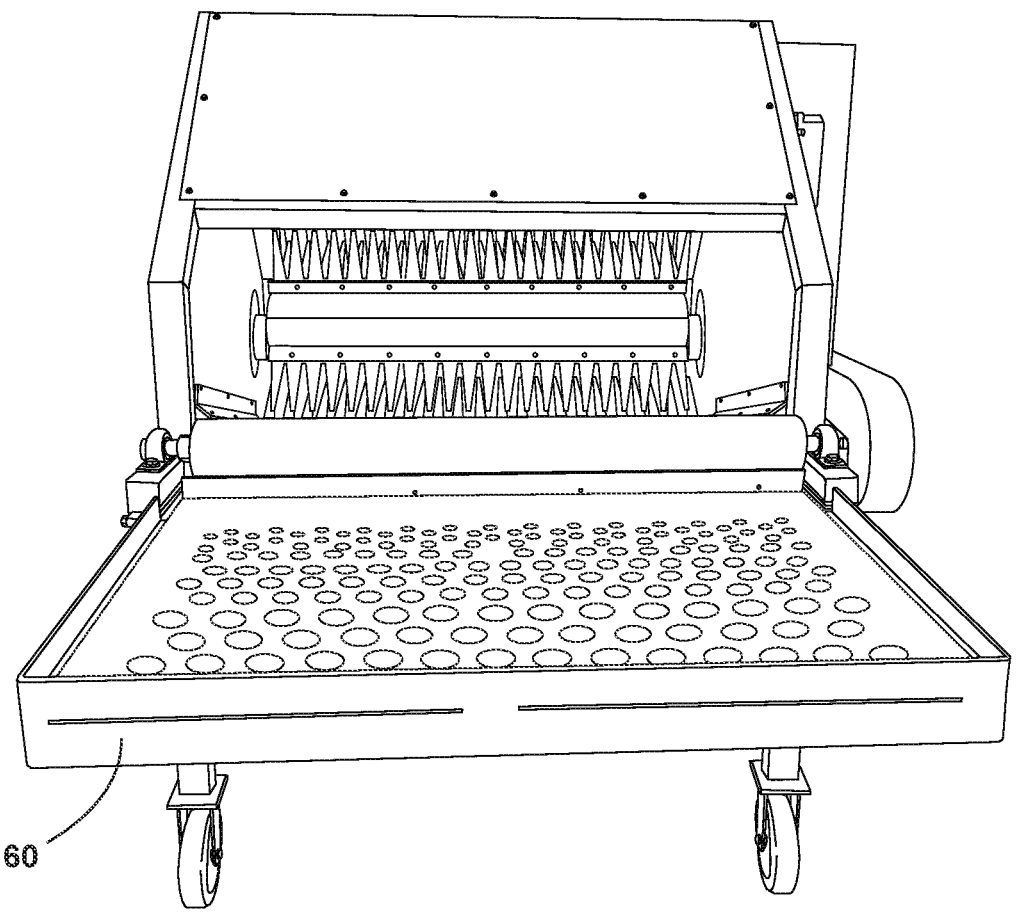
FIG. 13 is a rear view of the embodiment of FIG. 11.

With reference to FIGS. 11-13, a commercially available embodiment of the debucking machine is illustrated. In contrast to the schematic illustrations of FIGS. 1-2A, FIGS. 11-13 show the debucking machine with all panels and covers in place for safety. In such a configuration, the debucking zone is readily accessible from the exterior of the machine, but otherwise access to drive linkages and other moving parts is minimized, to reduce the chances of worker injury.

Figure 14:
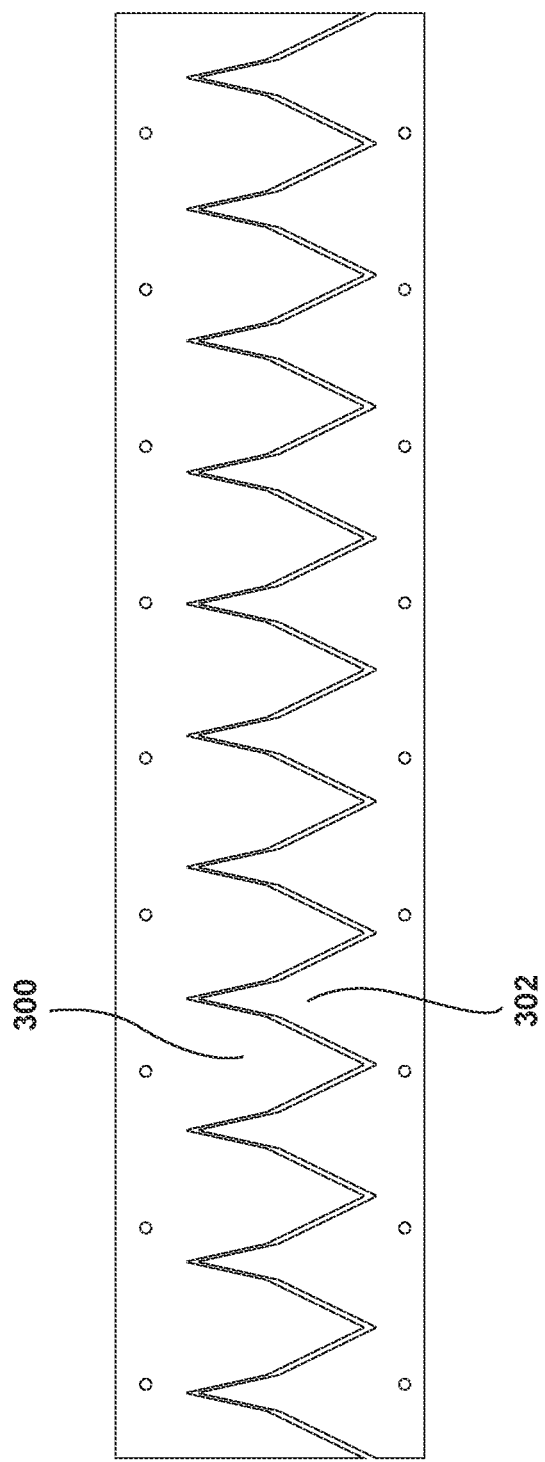
FIG. 14 is a schematic illustration of an alternative embodiment of the flexible rubberized combs, in which the combs are asymmetric, in that the upper roller comb has wide triangular teeth and the lower roller comb has narrow triangular teeth.

With reference to FIGS. 14-19, a variety of alternative shapes and sizes of rubberized combs are illustrated. FIG. 14 illustrates the use of asymmetrical combs, where the upper comb 300 is shaped differently from, but can closely interlace with the lower comb 302. Specifically, these combs 300, 302 have a triangular tooth that have two different angles, i.e., 30° at the bottom half then 40° near the tip of the tooth. In this embodiment the lower comb teeth are narrow triangular-shaped and the upper comb teeth are wide triangular-shaped. This arrangement could also be installed in the reverse. This dual angle triangular tooth arrangement is a strong "all around" tooth design and should perform adequately on many different kinds of hemp with many different moisture contents.

Figure 15:
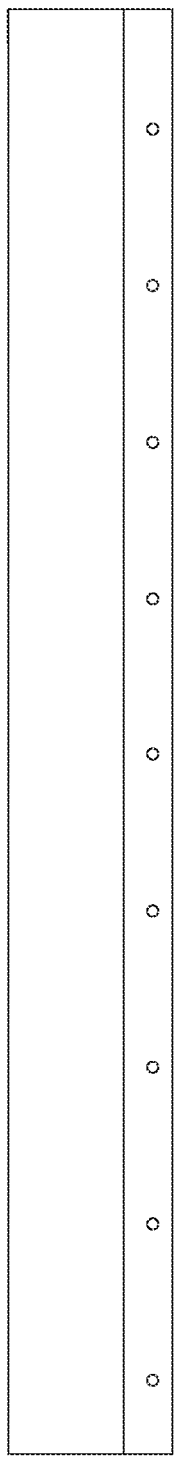
FIG. 15 is a schematic illustration of an alternative embodiment of a flexible rubberized comb that does not have teeth, but instead is a straight "wiper-blade" design.

FIG. 15 illustrates an alternative embodiment with a "wiper blade" structure that is without teeth. This embodiment may create a shaking action on the hemp, with very little interlacing or pulling action. This wiper-blade embodiment could be used for extra dry plant material. Preferably, the FIG. 15 wiper-blade is constructed from gum rubber, or another material that is softer than the conveyor belt material used for each of the other embodiments disclosed herein. This softer gum rubber material would be gentler for debucking very dry hemp plants.

Figure 16:
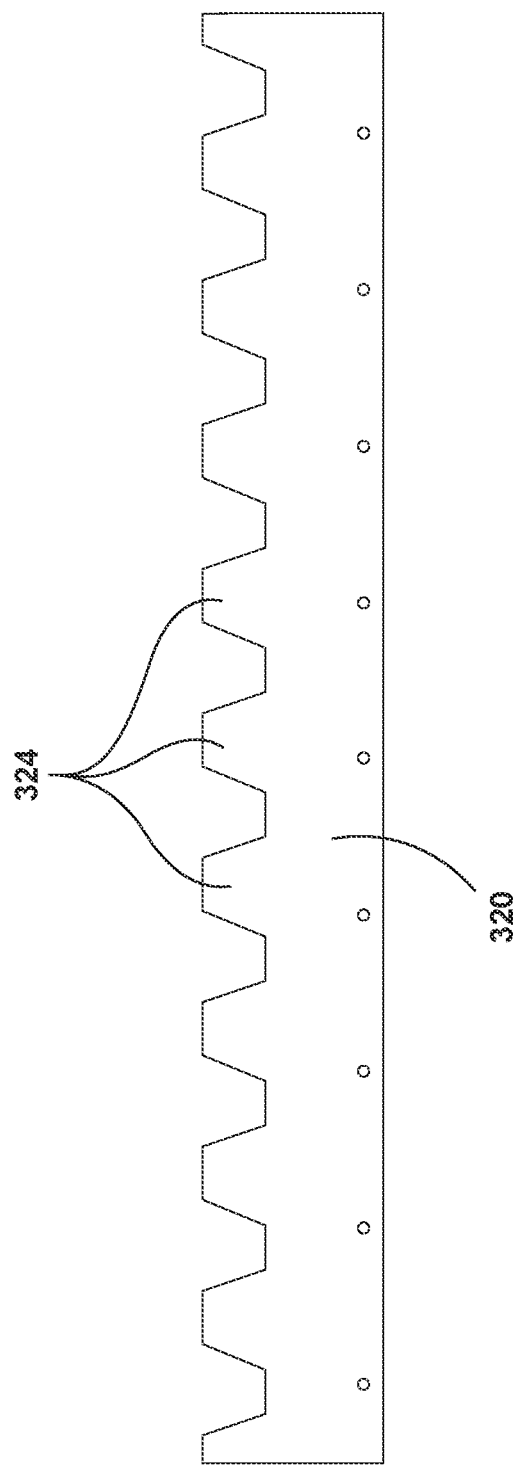
FIG. 16 is a schematic illustration of an alternative embodiment of a flexible rubberized comb that has trapezoidal-shaped teeth.

FIG. 16 illustrates another embodiment, where the comb 320 has teeth 324 that are trapezoidal-shaped. This trapezoidal shape would also be advantageous as a shaker (agitator) pattern for extra dry material.

Figure 17:
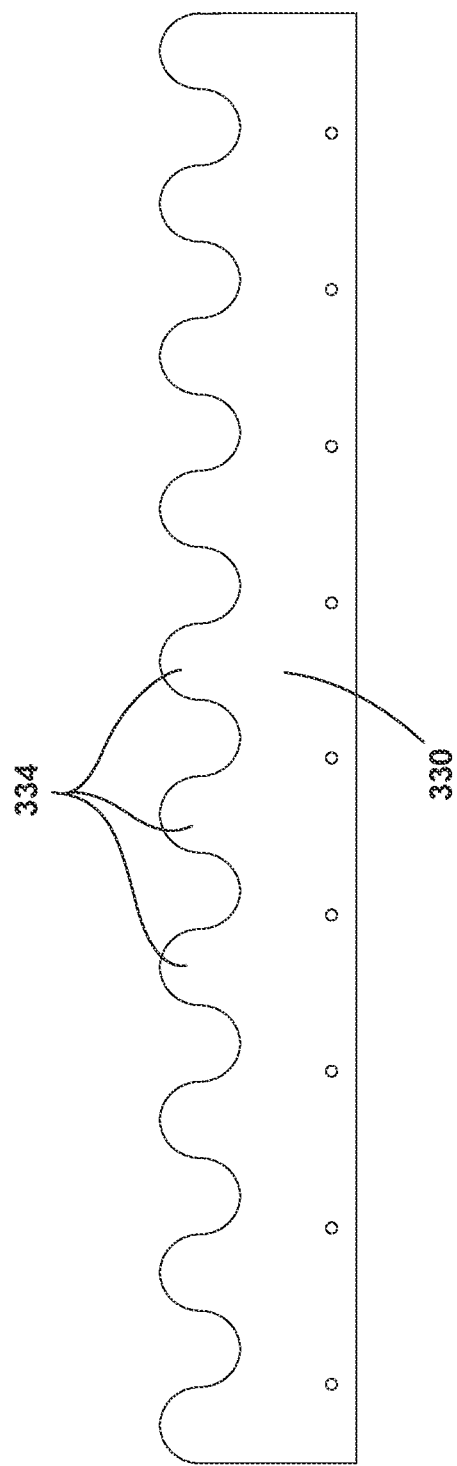
FIG. 17 is a schematic illustration of an alternative embodiment of a flexible rubberized comb that has half-moon, or "lune-shaped" teeth.

FIG. 17 illustrates another embodiment, where the comb 330 has teeth 334 that are half-moon, or "lune-shaped." The lune-shaped teeth 334 tend to wrap around hemp stems and pull buds off aggressively and quickly depending on the radius of the teeth 334. Small radius teeth should be used for dense material to reach down in the small spaces. Large radius teeth may serve as more of an agitator for dryer material.

Figure 18:
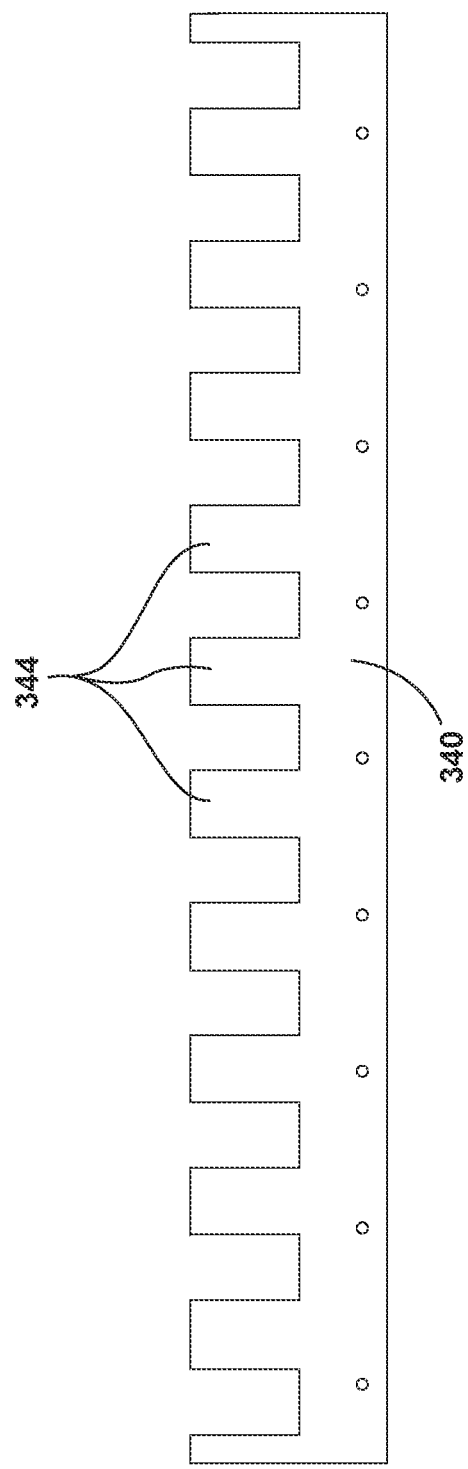
FIG. 18 is a schematic illustration of an alternative embodiment of a flexible rubberized comb that has rectangular or "square-shaped" teeth.

FIG. 18 illustrates another embodiment, where the comb 340 has teeth 344 that are rectangular or "square-shaped."

Figure 19:
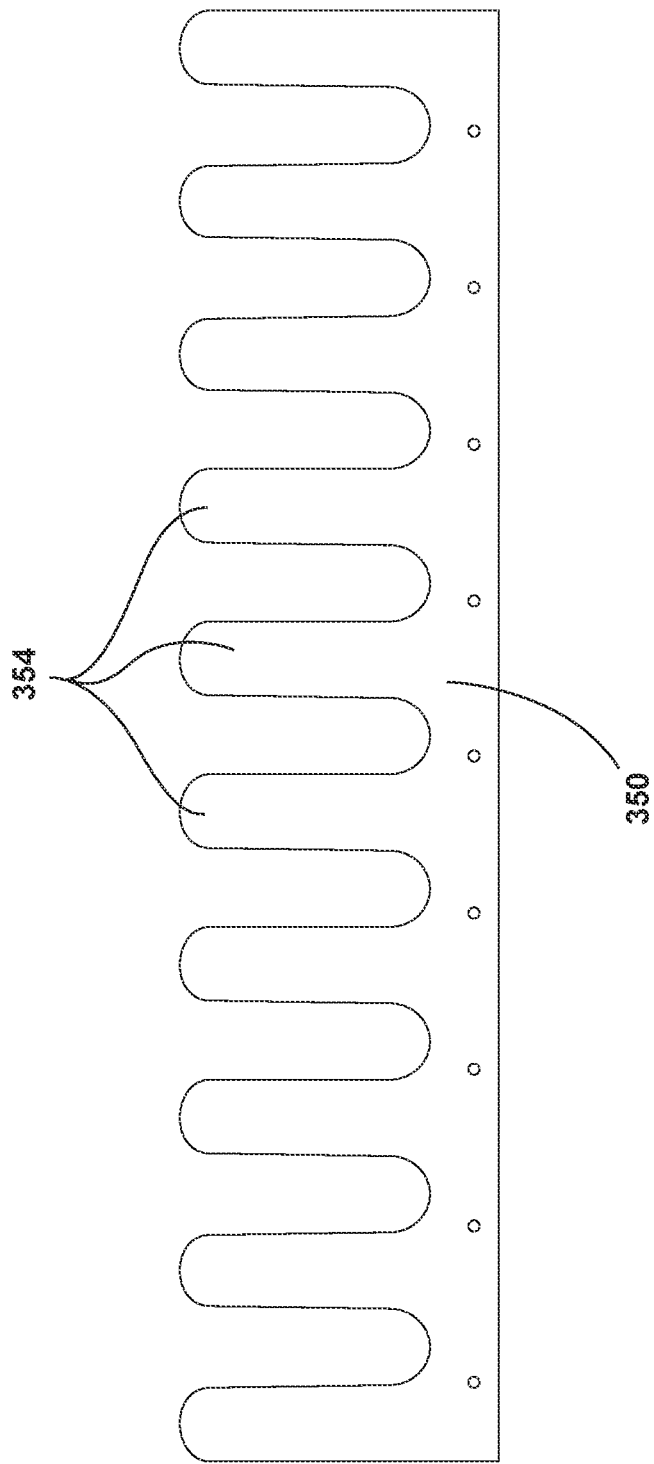
FIG. 19 is a schematic illustration of an alternative embodiment of a flexible rubberized comb that has "finger-shaped" teeth.

FIG. 19 illustrates yet another embodiment, where the comb 350 have teeth 354 that are "finger-shaped."

Embodiments disclosed herein are each adjustable to enable the operator to adjust the speed of rotation of the comb rollers, the size and density of the teeth on the comb rollers, and the alignment of the teeth of the upper and lower combs. Each of these adjustments may be helpful for an operator to most effectively debuck harvested *cannabis* or hemp plants of different sizes or moisture levels. The three inch teeth are best suited for plants which are denser in the number of flowers and/or which have a higher moisture content. Four inch teeth are a standard size and work with most *cannabis* plants. Five inch teeth are best suited for hemp plants that are over dried and brittle. Farmers can choose to use any combination of comb lengths such as three and four inch teeth in an alternating pattern depending on the moisture level and density of their *cannabis* plants.

Figure 20:
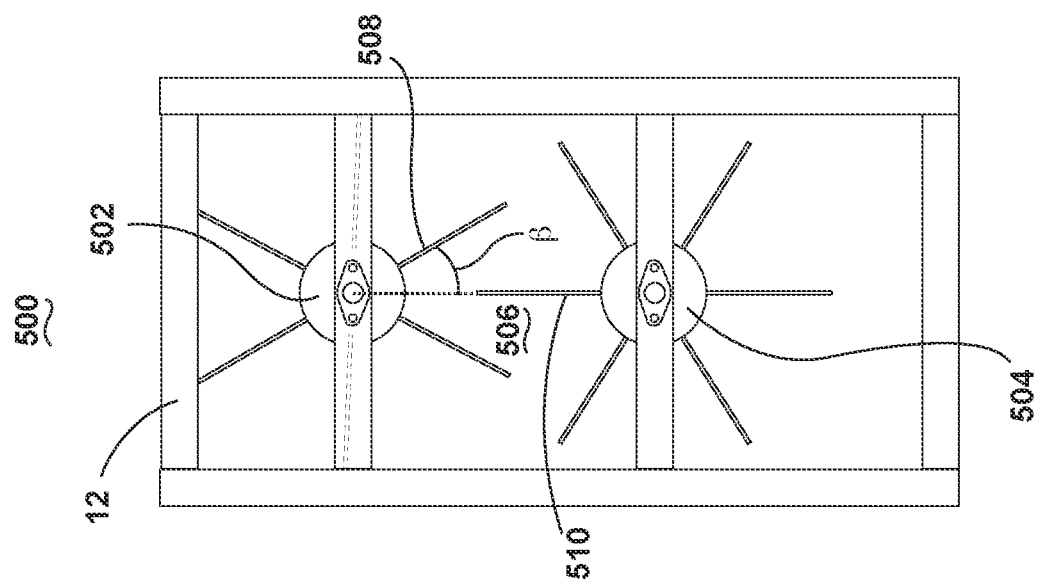
FIG. 20 is a simplified schematic side view of an embodiment of the debucking machine illustrating the interlacing of the flexible rubberized comb teeth in the debucking zone when the upper roller and the lower roller are adjusted to have a zero degree rotational offset angle.
Figure 21:
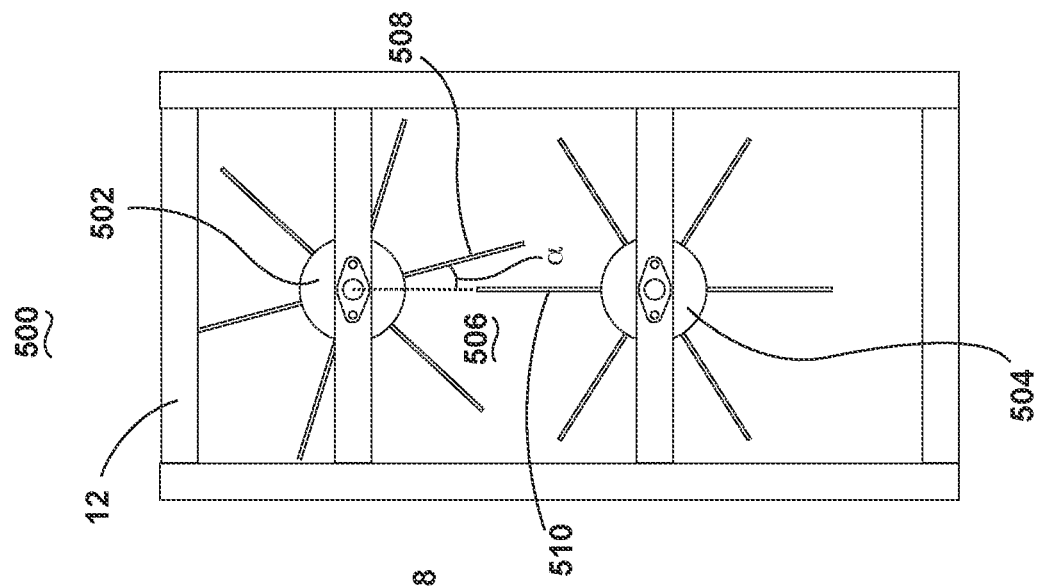
FIG. 21 is a simplified schematic side view of the embodiment of the debucking machine of FIG. 20, illustrating the interlacing of the flexible rubberized comb teeth in the debucking zone when the upper roller and the lower roller are adjusted to have a fifteen degree rotational offset angle α.
Figure 22:
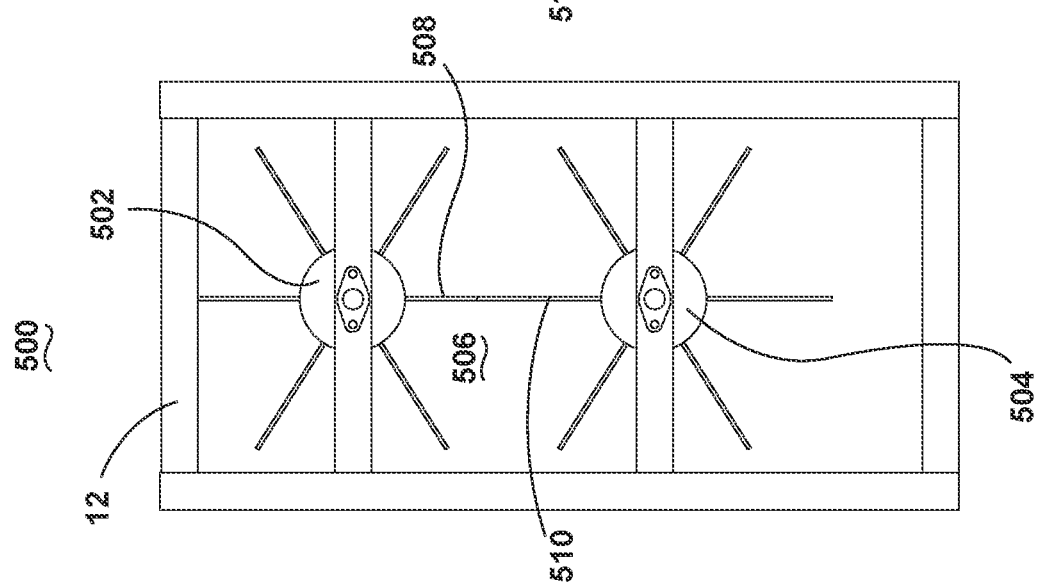
FIG. 22 is a simplified schematic side view of the embodiment of the debucking machine of FIG. 20, illustrating the interlacing of the flexible rubberized comb teeth in the debucking zone when the upper roller and the lower roller are adjusted to have a thirty degree rotational offset angle β.

With reference to FIGS. 20-22, simplified side plan views of the debucking machine 500 are provided, in order to illustrate the timing and adjustability of the action of the upper roller 502 and lower roller 504 with respect to one another. Each roller is rotationally linked to the drive linkage. When in operation, the upper roller 502 and lower roller 504 are fixed in their rotational relationship to one another. However, when the machine is off, this rotational relationship may be adjusted so that the action of the combs in the debucking zone is altered to be more or less aggressive, depending on the needs of the farmer.

In FIG. 20, the upper roller 502 and the lower roller 504 are rotationally aligned so that they have the closest interlace 506 of the teeth on their combs 508, 510. In this position, there is a zero degree rotational offset angle. This position shows the most aggressive rotational setting. In this embodiment, the teeth 508, 510 are triangular and have a tip and a crotch, so that the interlacing of the teeth of the upper roller and the lower roller define an interlace tolerance as the distance between the tip on the upper comb and the crotch on the lower comb, at their closest point during a revolution of the upper roller and a revolution of the lower roller. Adjusting the rotational offset angle will, in turn, adjust this interlace tolerance. In a preferred embodiment, the when the rotational offset angle is zero, this interlace tolerance is tolerance is less than 0.3 inches, and most preferably, about 0.25 inches. This setting thus results in a more aggressive debucking action for "wet" *cannabis* and hemp flower.

In FIG. 21, the rollers have been adjusted to have a moderate rotational setting. Specifically, the upper roller 502 has been adjusted to have a rotational offset angle α with respect to the lower roller 504. As illustrated, the angle α is a 15 degree rotational offset. Thus, at their closest approach, the combs of the upper roller 502 and the lower roller 504 will not touch, but instead will have a more gentle interlacing action. This setting results in a moderately aggressive debucking action for "moderately dry" *cannabis* and hemp flower.

In FIG. 22, the upper roller 502 and the lower roller 504 are rotationally adjusted to have the least aggressive rotational setting. Specifically, the upper roller 502 has been adjusted to have a rotational offset angle β with respect to the lower roller. As illustrated, the angle β is a 30 degree rotational offset. Thus, at their closest approach, the combs of upper roller 502 and lower roller 504 will not touch, but instead will have the most gentle interlacing action. This setting results in a less aggressive debucking action for "very dry" *cannabis* and hemp flower.

In practice, this rotational offset angle can be achieved in a number of ways. In one embodiment, the debucking machine 10 has a spring drive linkage tensioner 600 operably affixed to the frame 12. The spring drive linkage tensioner 600 is biased to tension the drive linkage; however, the spring drive linkage tensioner 600 may be actuated to release tension on the drive linkage, such that the lower roller (or as the case may be, the upper roller) may be rotated to adjust the rotational offset angle. With a drive belt or drive chain, the rotational offset angle can be any degree desired, limited only by the length of the chain link or belt node.

With reference to FIG. 23, an exemplary specification sheet for the rubberized comb material is provided. This specification sheet is for a conventional conveyor belt material, which may be cut to the desired comb shape and length by, for example, a water-jet cutting tool. Use of this material results in both the desired gentle debucking action described herein, but also a durability of the combs. Applicant has run thousands of pounds of hemp through an embodiment of the machine with very little wear to the rubberized triangular combs. In one embodiment, the rubber teeth for the comb are made from quarter inch (0.25), double corded conveyor belt. In another embodiment of the combs are a substrate coated with a styrene butadiene rubber. In another embodiment the substrate is a poly/nylon blend. In another embodiment the styrene butadiene rubber coating is at least 1/16 inches thick. In another embodiment the first plurality of comb teeth has a first side and a second side, where the styrene butadiene rubber coating of the first side is 1/16 inches thick and the styrene butadiene rubber coating of the second side is 1/8 inches thick.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed.

Insofar as the description above discloses any additional subject matter that is not within the scope of the claims below, the inventions are not dedicated to the public and the right to file one or more applications to claim such additional inventions is reserved.

What is claimed is:

1. A *cannabis* and hemp flower debucking machine comprising:
a frame;
an upper roller rotatably mounted to the frame, wherein the upper roller comprises a first rubberized comb with a first plurality of comb teeth;
a lower roller rotatably mounted to the frame, wherein the lower roller comprises a second rubberized comb with a second plurality of comb teeth;
a drive motor;
a drive linkage operably connected to the drive motor;
wherein the upper roller is operably connected to the drive motor by the drive linkage so that the upper roller is rotatable in a first direction;
wherein the lower roller is operably connected to the drive motor by the drive linkage so that the lower roller is rotatable in a second direction that is opposite of the first direction;
wherein the upper roller and the lower roller are mounted such that upon rotation of the upper roller in the first direction, and rotation of the lower roller in the second direction, the first plurality of rubberized comb teeth interlace with the second plurality of rubberized comb teeth to establish a debucking zone, whereby the interlace of the first plurality of rubberized comb teeth and the second plurality of rubberized comb teeth in the debucking zone will pull material in the debucking zone toward an interior of the frame;
wherein the first plurality of comb teeth and the second plurality of comb teeth are not symmetrically shaped;
wherein the first plurality of comb teeth are narrow triangular-shaped;
wherein the second plurality of comb teeth are wide triangular-shaped; and
wherein the debucking zone is accessible from outside of the frame.

2. The debucking machine of claim 1 comprising:
wherein the upper roller comprises between two and eight rubberized combs, each of which has a first plurality of comb teeth; and
wherein the lower roller comprises between two and eight rubberized combs, each of which has a second plurality of comb teeth.

3. The debucking machine of claim 1 comprising:
wherein the upper roller comprises six rubberized combs, each of which has a first plurality of comb teeth; and
wherein the lower roller comprises six rubberized combs, each of which has a second plurality of comb teeth.

4. The debucking machine of claim 1 comprising:
a plurality of wheels, operably affixed to the frame to enable the frame to be moved by rolling the wheels along a surface.

5. The debucking machine of claim 4 wherein each of the plurality of wheels comprises a caster wheel, and wherein each of the caster wheels is swivel-able and lockable.

6. The debucking machine of claim 1 comprising:
wherein the debucking machine has a width, and a height;
wherein the width is between 36 inches and 96 inches; and
wherein the height is a maximum of 72 inches.

7. The debucking machine of claim 1 comprising:
wherein the debucking machine has a width, and a height;
wherein the width is approximately 50 inches; and
wherein the height is 72 inches.

8. The debucking machine of claim 1 further comprising:
a front conveyor belt roller mounted on the frame at a first position under the upper roller and lower roller;
a rear conveyer belt roller mounted on the frame at a second position that is distal from the first position;
a conveyor belt mounted on the front conveyor belt roller and the rear conveyer belt roller; and
whereby, *cannabis* and hemp flower that is debucked by the interlacing of the first plurality of rubberized comb teeth with the second plurality of rubberized comb teeth will fall onto the conveyor belt at about the first position and may be transported to the second position by the conveyor belt.

9. The debucking machine of claim 8 further comprising:
a sorting table mounted to the frame in a generally horizontal position;
wherein the sorting table has a proximal side and a distal side;
wherein at least a portion of the proximal side of the sorting table is below the rear conveyor belt roller;
whereby *cannabis* and hemp flower that is debucked by the interlacing of the first plurality of rubberized comb teeth with the second plurality of rubberized comb teeth will fall onto the conveyor belt at about the first position and may be transported to the second position, and further whereby the *cannabis* and hemp flower will be deposited onto the sorting table.

10. The debucking machine of claim 9 wherein the sorting table further comprises a plate with apertures of varying sizes and wherein the apertures near the proximal position are smallest and the apertures near the distal position are largest, such that *cannabis* and hemp flower deposited onto the sorting table may drop through the apertures of varying sizes and be sorted by size from smallest to largest.

11. The debucking machine of claim 10 further comprising:
a shaker mechanism, operably connected to the sorting table for shaking the sorting table, whereby such shaking will cause *cannabis* and hemp flower deposited onto the sorting table to migrate across the sorting table from the proximal side to the distal side, such that *cannabis* and hemp flower deposited onto the sorting table may drop through the apertures of varying sizes and be sorted by size from smallest to largest without human intervention.

12. The debucking machine of claim 1 further comprising:
a removable bin positioned below the upper roller and the lower roller, whereby *cannabis* and hemp flower that is debucked by the interlacing of the first plurality of rubberized comb teeth with the second plurality of rubberized comb teeth will fall into the removable bin.

13. The debucking machine of claim 1 wherein the drive linkage is a drive chain.

14. The debucking machine of claim 1 wherein the drive linkage is a drive belt.

15. The debucking machine of claim 1 wherein the drive motor and drive linkage are configured to drive the upper roller and the lower roller to at least 60 revolutions per minute.

16. The debucking machine of claim 1 wherein the drive motor is a variable speed motor, such that the drive linkage can drive both the upper roller and the lower roller at a first rolling speed; and
wherein the first rolling speed is between 80 and 120 revolutions per minute.

17. The debucking machine of claim 1 wherein the first plurality of comb teeth comprises comb teeth that are approximately 3 inches in length.

18. The debucking machine of claim 1 wherein the first plurality of comb teeth comprises comb teeth that are approximately 6 inches in length.

19. The debucking machine of claim 1 wherein the first plurality of comb teeth comprises comb teeth that are between 3 and 6 inches in length.

20. The debucking machine of claim 1 wherein the first plurality of comb teeth are all uniform in length.

21. The debucking machine of claim 1 wherein the first plurality of comb teeth are not uniform in length.

22. The debucking machine of claim 1 comprising:
wherein the first plurality of comb teeth comprises conventional conveyor belt material.

23. The debucking machine of claim 1 wherein the first plurality of comb teeth comprises a substrate coated with a styrene butadiene rubber.

24. The debucking machine of claim 23 wherein the substrate is a poly/nylon blend.

25. The debucking machine of claim 23 wherein the styrene butadiene rubber coating is at least 1/16 inches thick.

26. The debucking machine of claim 23 wherein first plurality of comb teeth further comprises:
a first side;
a second side;
wherein the styrene butadiene rubber coating of the first side is 1/16 inches thick; and
wherein the styrene butadiene rubber coating of the second side is 1/8 inches thick.

27. The debucking machine of claim 1 comprising:
wherein the upper roller has a first rotational position;
wherein the lower roller has a second rotational position;
wherein a roller offset angle is the angle between the first rotational position and the second rotational position;
wherein the first rotational position and the second rotational position may be adjusted with respect to each other by changing the roller offset angle.

28. The debucking machine of claim 27 further comprising:
a spring drive linkage tensioner operably affixed to the frame;
wherein the spring drive linkage tensioner is biased to tension the drive linkage;
wherein the spring drive linkage tensioner may be actuated to release tension on the drive linkage, such that the lower roller may be rotated to adjust the second rotational position of the lower roller.

29. The debucking machine of claim 27 comprising:
wherein each of the first plurality of comb teeth has a first tip and a first crotch;
wherein each of the second plurality of comb teeth has a second tip and a second crotch;
whereby the interlacing of the first plurality of comb teeth and the second plurality of comb teeth has an interlace tolerance that is defined by the distance between the first tip and the second crotch at their closest point during a revolution of the upper roller and a revolution of the lower roller;
whereby the interlace tolerance is adjustable by adjustment of the first rotational position and second rotational position;
wherein when the rotational offset angle is zero degrees the interlace tolerance is less than 0.3 inches.

30. The debucking machine of claim 27 wherein the roller offset angle is set to zero degrees, thus resulting in a more aggressive debucking action for "wet" *cannabis* and hemp flower.

31. The debucking machine of claim 27 wherein the roller offset angle is set to fifteen degrees, thus resulting in a moderately aggressive debucking action for "moderately dry" *cannabis* and hemp flower.

32. The debucking machine of claim 27 wherein the roller offset angle is set to thirty degrees, thus resulting in a less aggressive debucking action for "very dry" *cannabis* and hemp flower.

33. A method of hemp flower debucking, using a debucking machine comprising:
    a frame;
    an upper roller rotatably mounted to the frame, wherein the upper roller comprises a first rubberized comb with a first plurality of comb teeth;
    a lower roller rotatably mounted to the frame, wherein the lower roller comprises a second rubberized comb with a second plurality of comb teeth;
    wherein the first plurality of comb teeth and the second plurality of comb teeth are not symmetrically shaped;
    wherein the first plurality of comb teeth are narrow triangular-shaped;
    wherein the second plurality of comb teeth are wide triangular-shaped;
    a drive motor;
    a drive linkage operably connected to the drive motor;
    wherein the upper roller is operably connected to the drive motor by the drive linkage so that the upper roller is rotatable in a first direction;
    wherein the lower roller is operably connected to the drive motor by the drive linkage so that the lower roller is rotatable in a second direction that is opposite of the first direction;
    wherein the upper roller and the lower roller are mounted such that upon rotation of the upper roller in the first direction, and rotation of the lower roller in the second direction, the first plurality of rubberized comb teeth interlace with the second plurality of rubberized comb teeth to establish a debucking zone, whereby the interlace of the first plurality of rubberized comb teeth and the second plurality of rubberized comb teeth in the debucking zone will pull material in the debucking zone toward an interior of the frame; and
    wherein the debucking zone is accessible from outside of the frame via an opening;
    the method of debucking comprising:
    engaging the drive motor such that the upper roller is rotating in the first direction and the lower roller is rotating in the second direction;
    selecting a harvested hemp plant that comprises a main stalk, branches, and hemp flowers on at least some of the branches;
    holding the harvested hemp plant by the main stalk;
    while maintaining a hold on the main stalk, inserting the branches and hemp flowers portions of the harvested hemp plant into the debucking zone;
    while maintaining a hold on the main stalk, moving the harvested hemp plant laterally within the debucking zone;
    while maintaining a hold on the main stalk, drawing the harvested hemp plant most of the way out of the debucking zone;
    assessing whether the harvested hemp plant has been sufficiently debucked; and
    when the user has assessed that the harvested hemp plant has been sufficiently debucked, withdrawing the harvested hemp plant from the debucking zone.

\* \* \* \* \*